(12) United States Patent
Doll

(10) Patent No.: US 6,396,947 B1
(45) Date of Patent: May 28, 2002

(54) PLACING TAGS ON SURFACE STRING SEQUENCES REPRESENTING A RASTER IMAGE

(75) Inventor: Joseph Doll, Broomfield, CO (US)

(73) Assignee: Colorcom Ltd., Broomfield, CO (US)

( * ) Notice: Subject to any disclaimer, the term of this patent is extended or adjusted under 35 U.S.C. 154(b) by 0 days.

(21) Appl. No.: 09/659,546

(22) Filed: Sep. 11, 2000

Related U.S. Application Data

(60) Division of application No. 09/523,920, filed on Mar. 9, 2000, which is a continuation-in-part of application No. 09/104,302, filed on Jun. 24, 1998, now Pat. No. 6,226,400.

(51) Int. Cl.$^7$ .................................................. G06K 9/00
(52) U.S. Cl. ...................... 382/162; 382/199; 382/242; 345/441
(58) Field of Search ................................. 382/241–243, 382/232, 197, 185, 199, 203, 162, 163, 166; 358/261.1, 426, 1.3, 1.5–1.7; 345/441–443, 440.1–440.2, 467, 589, 599

(56) References Cited

U.S. PATENT DOCUMENTS

| | | | | | |
|---|---|---|---|---|---|
| 4,777,651 | A | * | 10/1988 | McCann et al. | 382/242 |
| 5,007,098 | A | * | 4/1991 | Kumagai | 382/185 |
| 5,220,647 | A | * | 6/1993 | Kumagai | 345/599 |
| 5,233,671 | A | * | 8/1993 | Murayama | 382/242 |
| 5,396,582 | A | * | 3/1995 | Kahkoska | 358/1.3 |
| 5,579,405 | A | * | 11/1996 | Ishida et al. | 382/197 |
| 5,642,476 | A | * | 6/1997 | Turner | 345/443 |
| 5,748,777 | A | * | 5/1998 | Katayam et al. | 382/199 |
| 5,956,428 | A | * | 9/1999 | Ausbeck, Jr. | 382/242 |
| 6,226,400 | B1 | * | 5/2001 | Doll | 382/163 |

* cited by examiner

*Primary Examiner*—Bhavesh Mehta
*Assistant Examiner*—Ishrat Sherali
(74) *Attorney, Agent, or Firm*—Howard H. Sheerin

(57) ABSTRACT

An apparatus is disclosed for converting a raster image comprising a plurality of pixels into a plurality of data tags representing at least one shape in the raster image. The apparatus comprises a computer program, or an integrated circuit implementing the steps of the computer program, wherein the computer program comprises:

(a) a border definer for generating a border string sequence representing a border in the raster image, wherein: the border string sequence comprises a plurality of surface strings; and
a surface string comprises a receive slope and a send slope representing a slope of the border passing through a predetermined area of the raster image;

(b) a surface string sequencer for converting the border string sequence into one or more surfaces, wherein a surface comprises one or more surface string sequences representing a section of the border string sequence; and (c) a data tagger comprising:
a non-axial line tag generator, responsive to the surface string sequences, for generating data tags which define a non-axial line shape in the raster image;
an axial line tag generator, responsive to the surface string sequences, for generating data tags which define an axial line shape in the raster image;
a curve tag generator, responsive to the surface string sequences, for generating data tags which define a curve shape in the raster image; and
a shape selector for selecting between the data tags generated by the non-axial line tag generator, the axial line tag generator, and the curve tag generator based on a predetermined criteria.

32 Claims, 29 Drawing Sheets

FIG. 8C

QUAD 1

| M | J | L | N |
|---|---|---|---|
| I | C | D | K |
| E | A | B | G |
| O | F | H | P |

QUAD 2

| N | L | J | M |
|---|---|---|---|
| K | D | C | I |
| G | B | A | E |
| P | H | F | O |

QUAD 3

| P | H | F | O |
|---|---|---|---|
| G | B | A | E |
| K | D | C | I |
| N | L | J | M |

QUAD 4

| O | F | H | P |
|---|---|---|---|
| E | A | B | G |
| I | C | D | K |
| M | J | L | N |

FIG. 8D

QUAD 1

| Q | R | S | T | U |
|---|---|---|---|---|
| M | I | E | O | V |
| J | C | A | F | W |
| L | D | B | H | X |
| N | K | G | P | Y |

QUAD 2

| N | L | J | M | Q |
|---|---|---|---|---|
| K | D | C | I | R |
| G | B | A | E | S |
| P | H | F | O | T |
| Y | X | W | V | U |

QUAD 3

| Y | X | W | V | U |
|---|---|---|---|---|
| P | H | F | O | T |
| G | B | A | E | S |
| K | D | C | I | R |
| N | L | J | M | Q |

QUAD 4

| U | V | W | X | Y |
|---|---|---|---|---|
| T | O | F | H | P |
| S | E | A | B | G |
| R | I | C | D | K |
| Q | M | J | L | N |

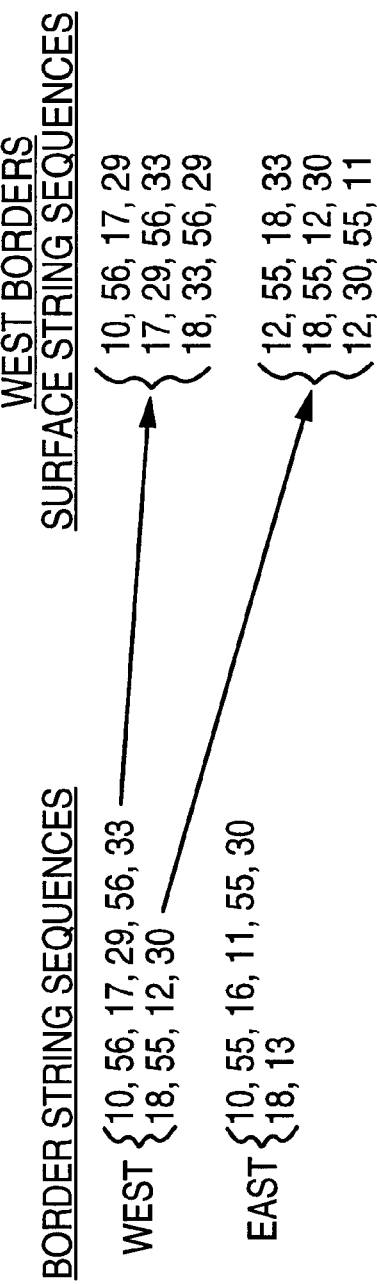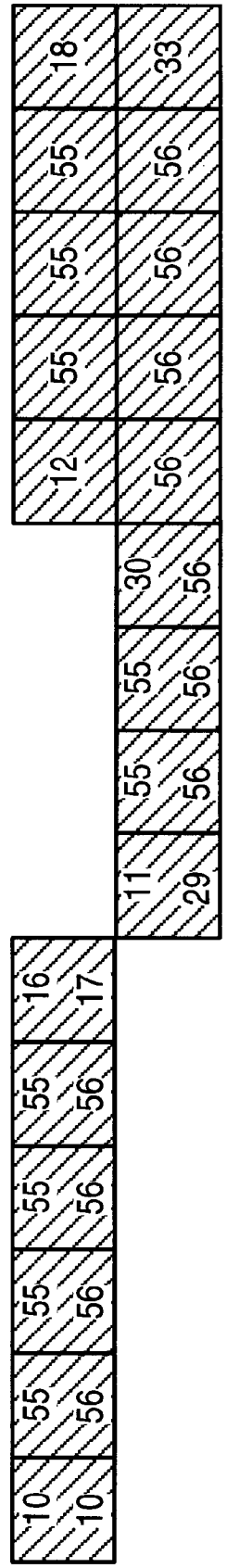
FIG. 11B

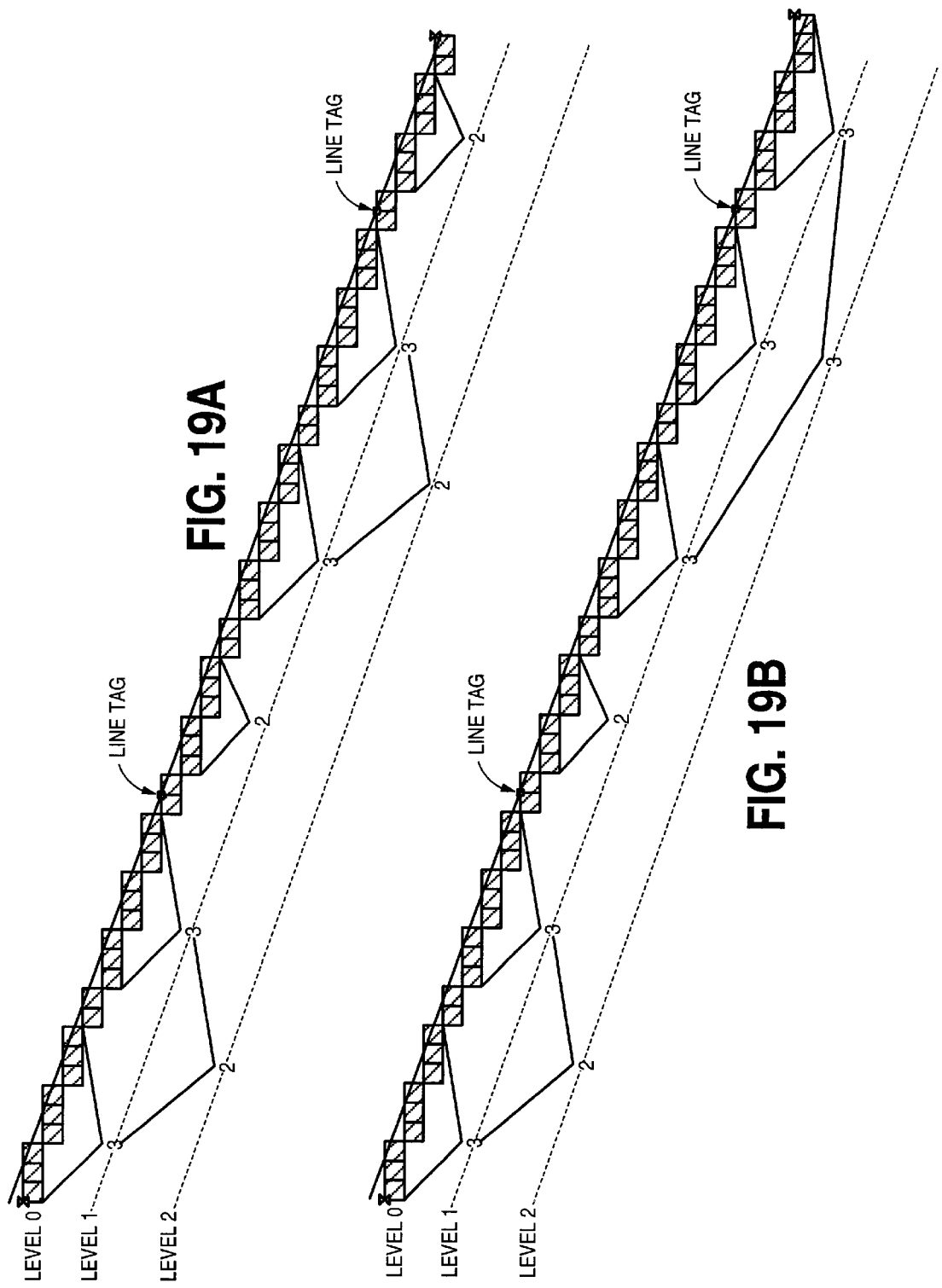

PLACING TAGS ON SURFACE STRING SEQUENCES REPRESENTING A RASTER IMAGE

This application is a divisional of U.S. patent application Ser. No. 09/523,920 filed Mar. 9, 2000 the entire disclosure of which is hereby incorporated by reference. Ser. No. 09/523,920 is a CIP of 09/104/302 filed Jun. 24, 1998, U.S. Pat. No. 6,226,400.

FIELD OF INVENTION

The present invention relates to the conversion of a raster image into a vector format, particularly to an apparatus and method for converting a raster image comprising a plurality of pixels into a plurality of data tags representing at least one shape in the raster image.

BACKGROUND OF THE INVENTION

Image processing generally refers to the manipulation of pictorial data using computers. Computer Aided Design (CAD) is one example of how computers are used to draft complex engineering drawings such as mechanical, architectural or electrical drawings. Other examples of image processing include the manipulation of still photographs or cinema to achieve various effects such as feature enhancement, three-dimensional rendering, or animation. However, the term "image processing" is not limited to pictures it generally refers to the digitization and computer processing of any analog signal that represents something physical and perceptible in the world. An audio signal can be digitized and processed with computers to perform manipulations such as noise reduction or voice recognition; modulated electrical signals, such as telecommunications or cardiograms, can be digitized and processed by computers to extract pertinent information, and so on. The common factor in image processing is the need to digitize the continuous-time analog signal into a discrete-time digital signal that can be operated on by computers using boolean mathematics implemented in transistor logic circuits.

A common format for storing and manipulating digitized signals is simply to represent the digital data as a bit-map of pixels, where each pixel represents a particular characteristic (e.g., magnitude or color) of the analog signal. Typically, a picture is digitized into a bit-map of individual pixels where each pixel represents a color of the image in a very small, localized area. When the pixels are displayed as a congregation, the original picture appears without loss of perception to the human eye as long as there is sufficient resolution (number of pixels) both in spatial and color contexts. A black and white picture can be represented with one-bit pixels, where the state of the bit (0 or 1) represents the two colors, black and white. To digitize a picture comprising multiple colors, each pixel is represented using n-bits such that each pixel can take on one of $2^n$ different colors. The process of converting an analog image into a bit-map image is referred to as "rasterizing" the image.

There are several well known problems with raster images that limit or inhibit the full potential of computer manipulation. The amount of memory necessary to store a large photograph having many colors (thousands or even millions of colors) can be immense, and the problem is exacerbated when attempting to digitize a series of photographs such as a scene in a movie. Not only do raster images require large amounts of storage memory, but processing such a large amount of data can be slow, particularly when attempting to transfer raster images over a network such as the Internet.

Another problem inherent with the raster format is an inability to perform many of the desired image processing functions, such as three-dimensional rendering or animation. Even a simple operation such as magnifying the image results in a granular distortion caused by enlarging the pixels of the image as illustrated in FIGS. 1A and 1AA. It is possible to perform digital signal processing when magnifying a raster image by effectively re-sampling the image to attenuate the granular distortion that occurs due to the fixed resolution. However, this process only reduces the granular distortion rather than eliminate it. Furthermore, resampling the image is time consuming and not practical in many applications. Other operations, such as electronic focusing and automatic imaging, are simply not possible when the image is stored in a raster format.

The alternative is to convert the raster image into a mathematical format known as vectors. A vector is a mathematical description of the image which is not constrained by a fixed resolution as with raster data. Furthermore, vectors allow for a much more diverse range of image manipulations due to the mathematical representation of the image. A simple example of a vector is a line beginning at a particular X,Y point in a Cartesian plane and ending at another X,Y point in that plane. To date, however, converting raster images into a series of linear vectors has been largely unsuccessful. This is due to the immense number of different possible patterns that raster images can form. For example, a 3 by 3 pixel matrix of a nine color picture can take on about 21,000 different possible patterns. Each possibility must be accounted for when converting the image into a set of linear vectors. If just one more pixel is added to the matrix, the complexity increases exponentially. Consequently, techniques for converting raster images into linear vectors normally operate on only a small section of the image at a time. The problem with this approach is that the resulting vectorized image appears fragmented due to discontinuities when the individual sections are combined.

There have been other attempts to convert a raster image using vectors that are more abstract mathematical representations. For example, a technique referred to as wavelets attempts to represent the raster image as a series of interconnected mathematical equations. With wavelets, a particular feature of the image might be represented using a number of polynomials which approximate the feature contours. The problem with this technique, however, is that the equations become extremely complex unless the operation is constrained to only a small group of pixels. But again, distortion due to fragmentation occurs when attempting to combine the individual equations into a complete image. A similar distortion occurs with using fractals, a method where the image is represented using a library of different shapes which approximate the various features of an image. Similar to wavelets, however, discontinuities occur with fractals when attempting to combine the individual shapes which causes distortion due to fragmentation.

Another known method for raster to vector conversion, referred to as the Automatic Bezier Curve technique, draws Bezier curves through tags that are placed somewhat arbitrarily on the image. Unlike fractals or wavelets, Bezier techniques cannot convert complicated pictures without losing information. On the other hand, the Bezier technique can sequence equations together over a large number of pixels which reduces the amount of fragmentation typically associated with other techniques.

The Bezier method is illustrated in FIG. 1B. The first step is to identify the color borders for each feature in the image, and then to place somewhat arbitrarily tags on the borders.

These tags then become the new representation of the image. When the image is to be displayed, these tags are converted into a rasterized format by drawing Bezier curves through the tags as shown in FIG. 1B. The problem with the Bezier conversion technique is that it has a hard time dealing with complicated images. When tags are placed some definition is lost. In a complex image, many tags are placed resulting in a great deal of loss in picture definition. Even more severe is that the Bezier technique only looks at simple borders. In complex images, there is usually an interaction of shades that catch the eye. The Bezier curve technique treats all of these different shades as either borders or points. This often results in a vector representation that is more complicated than a raster representation; in effect, the Bezier solution can actually be worse than the problem.

There have been other attempts to represent the feature contours of an image using mathematics capable of spanning more than just a small area on the image. For example, U.S. Pat. No. 4,777,651 discloses a method of pixel-to-vector conversion where the line and edge features of the image are converted into a series of continous line segments. The line segments are generated by connecting a series of slope elements which follow the contour of a line or edge in the image. The slope elements are generated by scanning a 3×3 array of pixels through the raster image data and generating a slope vector for each pixel. The 3×3 array of pixels are evaluated to determine the slope of the image contour at the current pixel. The slope elements are then connected to form continous line segments that represent the contours of the image. The line segments are further processed to generate the vectors that can be understood and manipulated using computers.

The process of sequencing a series of slope elements into line segments which represent the contours of an image has been known in the art as early as 1961. See H. Freeman, "On the Encoding of Arbitrary Geometric Configurations," IRE Transactions, EC-10(2), June 1961, 260–268. Freeman describes the technique of scanning a square matrix through raster data to generate a slope element for each pixel, and then connecting the slope elements into line segments which represent the image contours.

There are drawbacks with the aforementioned prior art methods of sequencing slope elements into line segments to represent the image contours. Namely, U.S. Pat. No. 4,777, 651 is capable of sequencing line segments for contours of only black and white images. Thus, this technique cannot be applied to color images without first converting the image into black and white which means the color information is lost. Furthermore, the list of square matrices for generating the slope elements shown in FIG. 9 is not exhaustive and, consequently, fragmentation can occur when attempting to generate and connect the line segments. Still further, sequencing the line segments using only the slope values does not provide optimal information for generating the final vectors which ultimately represent the image. In other words, the vectors generated using this technique are not optimal because there is not enough information provided in line segments comprised of only slope values. Also, these techniques do not address the optical illusion which can manifest in images where the contrast in certain features determines or enables perception.

There is, therefore, a need for an improved method and apparatus for converting raster images into a vector representation. In particular, it is an aspect of the present invention to convert a raster image into a more efficient vector representation which does not significantly fragment the image when converted back into raster.

SUMMARY OF THE INVENTION

The present invention may be regarded as an apparatus for converting a raster image comprising a plurality of pixels into a plurality of data tags representing at least one shape in the raster image. The apparatus comprises a system memory for storing steps of a computer program, and a computer processor connected to the system memory for executing the steps of the computer program, wherein the computer program comprises:
(a) a border definer for generating a border string sequence representing a border in the raster image, wherein: the border string sequence comprises a plurality of surface strings; and
a surface string comprises a receive slope and a send slope representing a slope of the border passing through a predetermined area of the raster image;
(b) a surface string sequencer for converting the border string sequence into one or more surfaces, wherein a surface comprises one or more surface string sequences representing a section of the border string sequence; and
(c) a data tagger comprising:
a non-axial line tag generator, responsive to the surface string sequences, for generating data tags which define a non-axial line shape in the raster image;
an axial line tag generator, responsive to the surface string sequences, for generating data tags which define an axial line shape in the raster image;
a curve tag generator, responsive to the surface string sequences, for generating data tags which define a curve shape in the raster image; and
a shape selector for selecting between the data tags generated by the non-axial line tag generator, the axial line tag generator, and the curve tag generator based on a predetermined criteria.

The present invention may also be regarded as a method of converting a raster image comprising a plurality of pixels into a plurality of data tags representing at least one shape in the raster image, the method comprising the steps of the aforementioned computer program.

The present invention may also be regarded as an integrated circuit for converting a raster image comprising a plurality of pixels into a plurality of data tags representing at least one shape in the raster image, the image processing integrated circuit comprising logic circuits for implementing the steps of the aforementioned computer program.

The present invention may also be regarded as the aforementioned computer program embodied on a computer-readable medium.

BRIEF DESCRIPTION OF THE DRAWINGS

FIG. 8C illustrates an enhancement to the aspect of breaking contrast ties wherein the corner pixels of the 4×4 array of pixels are also evaluated.

FIG. 8D illustrates yet another enhancement to breaking contrast ties wherein the pixels evaluated is expanded to a 5×5 array of pixels.

FIG. 11B illustrates a more complex image feature comprising related borders and their corresponding surface string sequences.

FIGS. 19A and 19B illustrate the recursive algorithm for placing tags on a non-axial line comprising several contiguous plateaus without violating a coarse pixel.

DETAILED DESCRIPTION OF EMBODIMENTS

Figure 2:
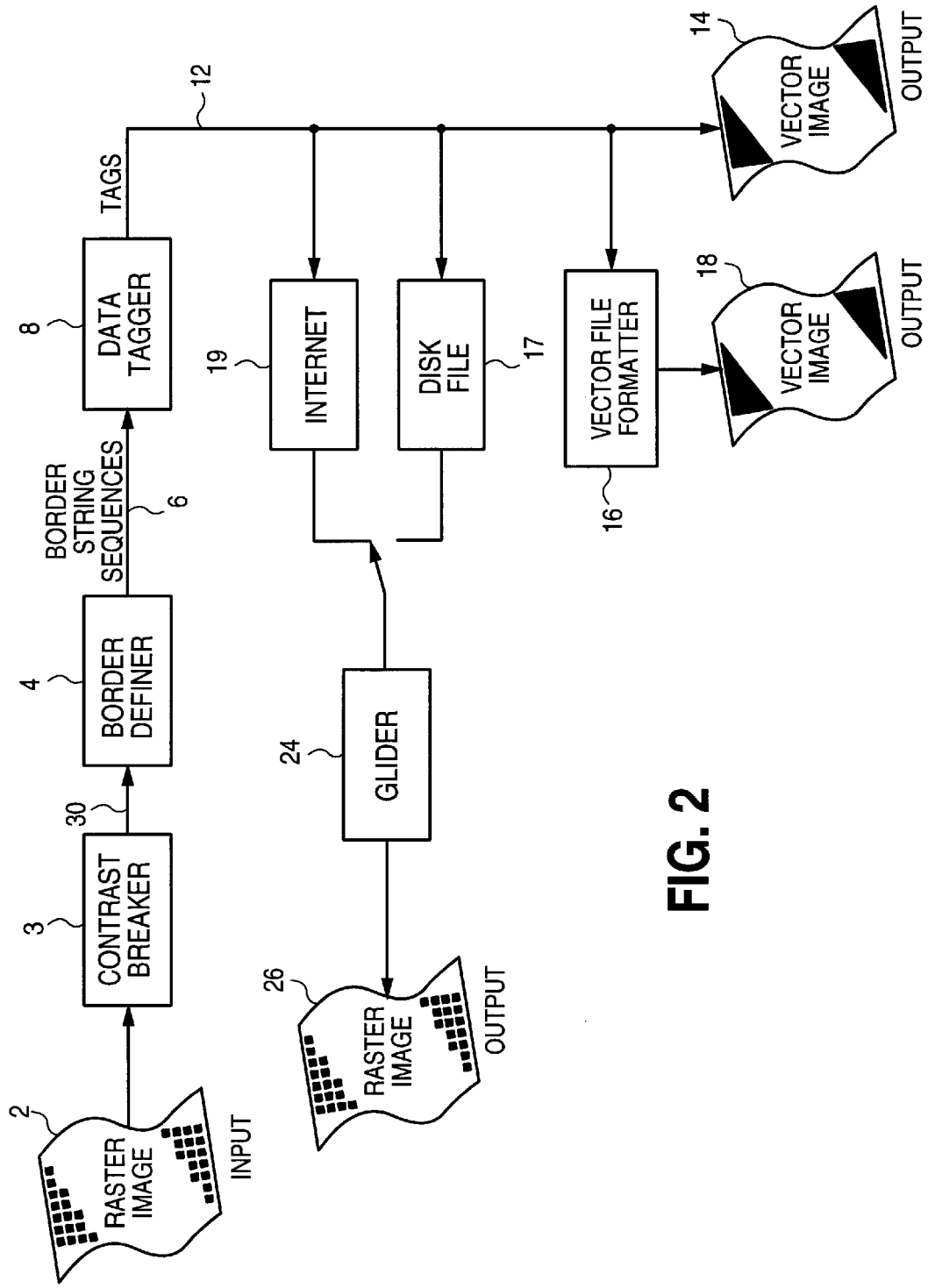
FIG. 2 is a block diagram of the elements for converting a raster image into a vector image according to an embodiment of the present invention.

FIG. 2 shows a block diagram of the elements used to convert a raster image into a vector image according to an embodiment of the present invention. The raster image data 2 that is to be converted into a vector image can come from many different alternative sources. For example, it may be generated by illuminating a photograph with a light source and detecting the reflected light with a charge-coupled-device (CCD). A CCD is typically formed of an array of individual photosensitive cells which detect an intensity or brightness of the light. Thus, the output of the CCD is an array of pixels which represent a portion of the raster image bit map. As the light source is scanned over the photograph, the pixels output by the CCD are concatenated to form the entire raster image. Color in the photograph can be detected by employing red-green-blue (RGB) filters in front of three respective CCDs, and then combining the outputs of the CCDs into an n-bit pixel that can represent one of $2^n$ colors.

The present invention is not limited to raster images that represent photographs. The present invention can also convert other digitized signals, such as audio or communication signals, into a vector format for more efficient and effective processing by computers. Such signals are typically generated by a transducer (e.g., a microphone, antenna, recording head, etc.) which senses and transduces into an electrical signal some physical manifestation, such as an acoustic or electromagnetic wave. Typically, the electrical signal is then digitized and converted into a raster format using an analog-to-digital (A/D) converter.-

The raster image data 2 processed by the present invention can be generated in real time meaning that the raster data can be converted directly into a vector format as the analog signal is being digitized. Alternatively, the raster image data 2 may be stored on a recording medium, such as a magnetic or optical disc, and processed at a later time by the present invention to define the color borders and convert the raster data into a vector format.

The raster image data 2, whether processed in real time or read from a storage medium, is processed by a contrast breaker 3 which resolves "contrast ties" in the image features. This aspect of the present invention is described in greater detail below with reference to FIGS. 7–9. After breaking contrast ties, the raster data is input into a border definer 4 which generates border string sequences 6 representing the color borders for features in the raster image. A data tagger 8 converts the border string sequences 6 into a set of tags 12. The tags 12 can be considered a type of vector format that can be manipulated directly and converted back into raster, or the tags 12 can be converted by a vector file formatter 16 into other well known vector formats 18.

The tags 12 in their direct form or converted to other vector formats are operated on, for example, by transmitting through the Internet 19 or storing to a disk file 17 (or performing vector rendering, resolution enhancement, data recognition, digital signal processing, etc.). The tags 12 may then be converted back into their raster representation 26 for viewing. The conversion back to raster format 26 is carried out by a glider 24 described in greater detail below.

Figure 3:
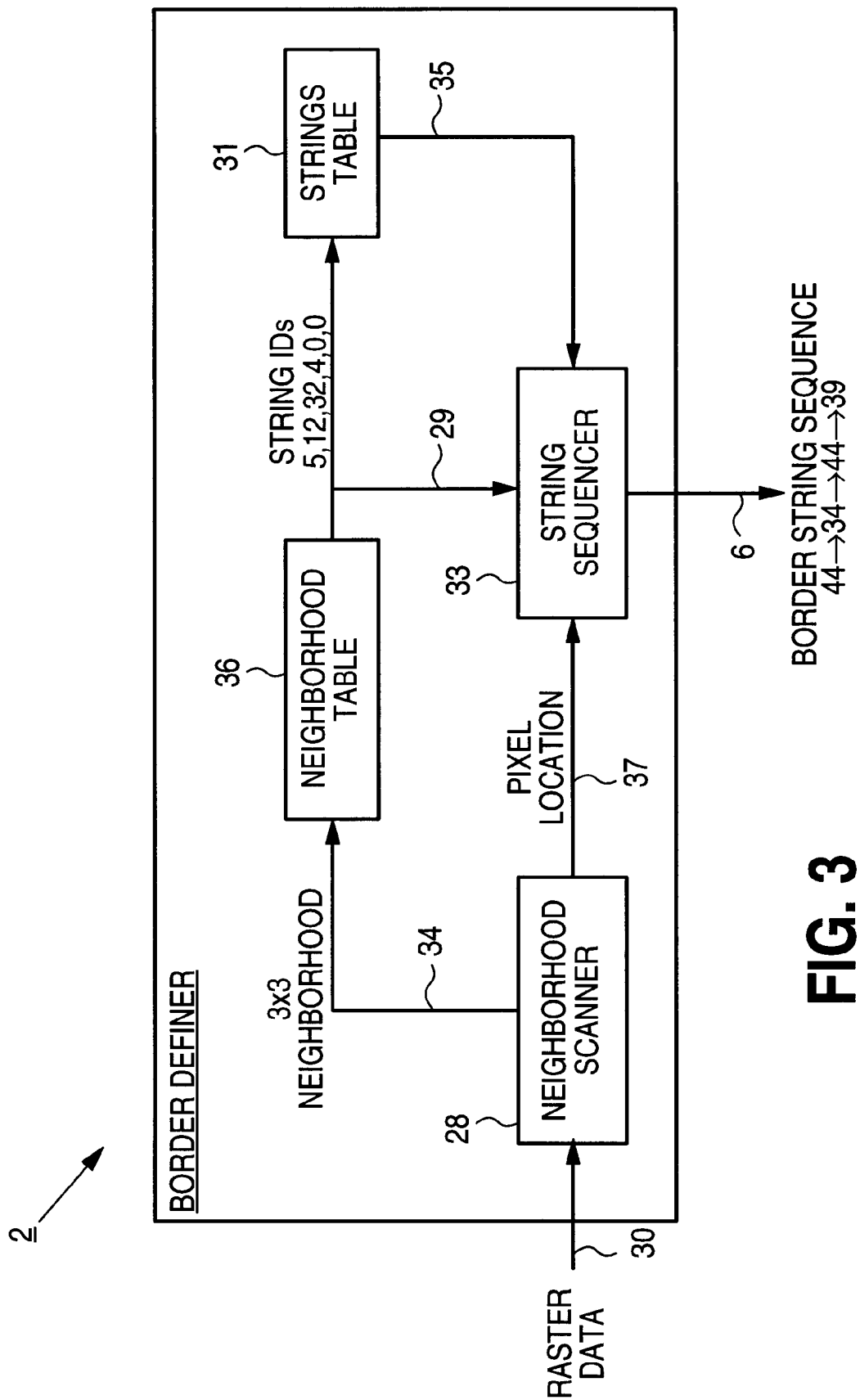
FIG. 3 shows further details of the border definer of FIG. 2.

The border definer 4 of FIG. 2 is illustrated in greater detail in FIG. 3. It comprises a neighborhood scanner 28 which scans through the raster data 30 and processes the image pixels in a square array referred to as a neighborhood. In the embodiment disclosed herein, the neighborhood represents a 3×3 array of image pixels. The scanning processes is understood with reference to FIG. 6A which hows the pixels of a raster image and a neighborhood 10a overlaying the image such that the first pixel 32 of the image is in the center of the neighborhood 10a (the cells of the neighborhood 10a laying outside the image are assigned the color Y). After processing this array of pixels, the neighborhood 10a is shifted to the right by one pixel so that the next pixel 14 of the image is in the center of the neighborhood 10a. This process continues until the neighborhood has passed over every pixel in the image ending at neighborhood 10d.

Figures 5A, 5B:
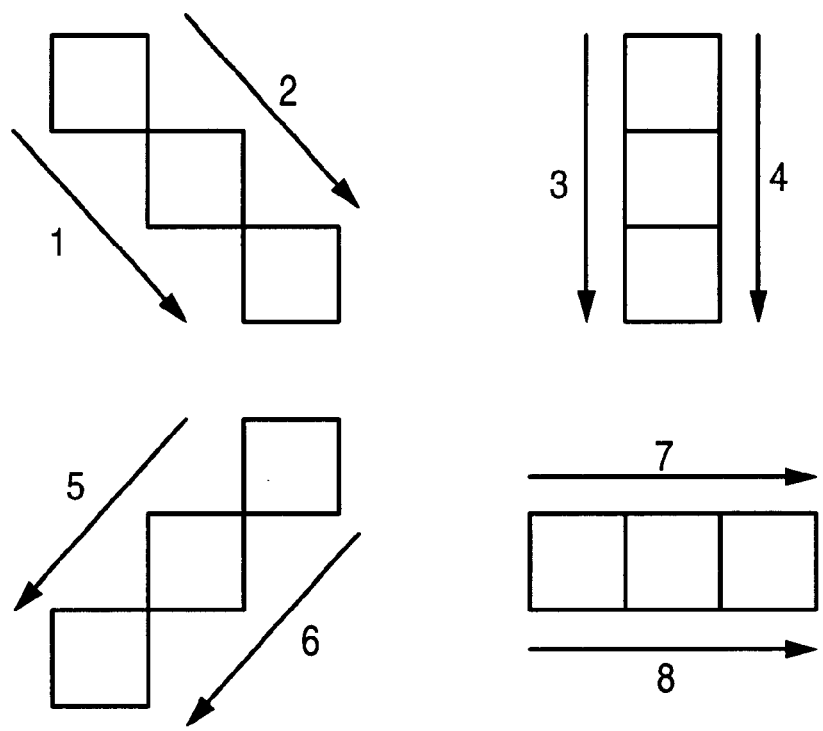
FIG. 5A shows a neighborhood of cells comprising a target cell surrounded by perimeter cells with color values of X, Y, or Z indicating that the color of the representative pixel in the image is either not considered (X), the same color (Y) as the pixel represented by the target cell, or a different color (Z) than the pixel representing the target cell.
FIG. 5B shows the possible slope values for the send and receive slopes of a surface string.

The image pixels are converted into corresponding cells which comprise a color value as shown in FIG. 5A. The neighborhood of cells comprises a target cell (in this case the center cell) denoted T and a number of perimeter cells denoted $P_{0-7}$ The color values that can be assigned to each cell are Y and Z. The color Y indicates that the color of the pixel represented by the cell is the same color as the pixel represented by the target cell (the color of the target cell T is always Y), and the color Z indicates that the color of the pixel represented by the cell has a different color than the pixel represented by the target cell. Thus, in a 3×3 array of cells with the target cell always having a color value of Y, there are $2^8$ or 256 different possible color combinations for the perimeter cells $P_{0-7}$.

Referring again to FIG. 3, the neighborhood of cells 34 generated for each pixel in the image is used as an address into a neighborhood lookup table 36. The content of the neighborhood lookup table is shown below:

Neighborhood Lookup Table

| SURFACE STRINGS | ADR | $P_0$ | $P_0$ | $P_2$ | $P_3$ | T | $P_4$ | $P_5$ | $P_6$ | $P_7$ |
|---|---|---|---|---|---|---|---|---|---|---|
| 00, 00, 00, 00, 00, 00; | 0 | Z | Z | Z | Z | Y | Z | Z | Z | Z |
| 01, 02, 00, 00, 00, 00; | 1 | Z | Z | Z | Z | Y | Z | Z | Z | Y |
| 03, 04, 00, 00, 00, 00; | 2 | Z | Z | Z | Z | Y | Z | Z | Y | Z |
| 03, 02, 00, 00, 00, 00; | 3 | Z | Z | Z | Z | Y | Z | Z | Y | Y |
| 05, 06, 00, 00, 00, 00; | 4 | Z | Z | Z | Z | Y | Z | Y | Z | Z |
| 48, 07, 46, 53, 00, 00; | 5 | Z | Z | Z | Z | Y | Z | Y | Z | Y |
| 05, 04, 00, 00, 00, 00; | 6 | Z | Z | Z | Z | Y | Z | Y | Y | Z |
| 48, 53, 00, 00, 00, 00; | 7 | Z | Z | Z | Z | Y | Z | Y | Y | Y |
| 10, 00, 00, 00, 00, 00; | 8 | Z | Z | Z | Z | Y | Y | Z | Z | Z |
| 09, 00, 00, 00, 00, 00; | 9 | Z | Z | Z | Z | Y | Y | Z | Z | Y |
| 15, 00, 00, 00, 00, 00; | 10 | Z | Z | Z | Z | Y | Y | Z | Y | Z |
| 15, 00, 00, 00, 00, 00; | 11 | Z | Z | Z | Z | Y | Y | Z | Y | Y |
| 12, 13, 00, 00, 00, 00; | 12 | Z | Z | Z | Z | Y | Y | Y | Z | Z |
| 12, 07, 46, 00, 00, 00; | 13 | Z | Z | Z | Z | Y | Y | Y | Z | Y |
| 12, 00, 00, 00, 00, 00; | 14 | Z | Z | Z | Z | Y | Y | Y | Y | Z |
| 12, 00, 00, 00, 00, 00; | 15 | Z | Z | Z | Z | Y | Y | Y | Y | Y |
| 14, 00, 00, 00, 00, 00; | 16 | Z | Z | Z | Y | Y | Z | Z | Z | Z |
| 17, 16, 00, 00, 00, 00; | 17 | Z | Z | Z | Y | Y | Z | Z | Z | Y |
| 18, 00, 00, 00, 00, 00; | 18 | Z | Z | Z | Y | Y | Z | Z | Y | Z |
| 16, 00, 00, 00, 00, 00; | 19 | Z | Z | Z | Y | Y | Z | Z | Y | Y |
| 41, 00, 00, 00, 00, 00; | 20 | Z | Z | Z | Y | Y | Z | Y | Z | Z |
| 07, 46, 16, 00, 00, 00; | 21 | Z | Z | Z | Y | Y | Z | Y | Z | Y |
| 18, 00, 00, 00, 00, 00; | 22 | Z | Z | Z | Y | Y | Z | Y | Y | Z |
| 16, 00, 00, 00, 00, 00; | 23 | Z | Z | Z | Y | Y | Z | Y | Y | Y |
| 56, 55, 00, 00, 00, 00; | 24 | Z | Z | Z | Y | Y | Y | Z | Z | Z |
| 17, 55, 00, 00, 00, 00; | 25 | Z | Z | Z | Y | Y | Y | Z | Z | Y |
| 55, 00, 00, 00, 00, 00; | 26 | Z | Z | Z | Y | Y | Y | Z | Y | Z |
| 55, 00, 00, 00, 00, 00; | 27 | Z | Z | Z | Y | Y | Y | Z | Y | Y |
| 13, 55, 00, 00, 00, 00; | 28 | Z | Z | Z | Y | Y | Y | Y | Z | Z |
| 07, 46, 77, 00, 00, 00; | 29 | Z | Z | Z | Y | Y | Y | Y | Z | Y |
| 55, 00, 00, 00, 00, 00; | 30 | Z | Z | Z | Y | Y | Y | Y | Y | Z |
| 55, 00, 00, 00, 00, 00; | 31 | Z | Z | Z | Y | Y | Y | Y | Y | Y |
| 20, 21, 00, 00, 00, 00; | 32 | Z | Z | Y | Z | Y | Z | Z | Z | Z |
| 22, 23, 00, 00, 00, 00; | 33 | Z | Z | Y | Z | Y | Z | Z | Z | Y |
| 24, 25, 00, 00, 00, 00; | 34 | Z | Z | Y | Z | Y | Z | Z | Y | Z |
| 24, 23, 00, 00, 00, 00; | 35 | Z | Z | Y | Z | Y | Z | Z | Y | Y |
| 61, 62, 00, 00, 00, 00; | 36 | Z | Z | Y | Z | Y | Z | Y | Z | Z |
| 61, 07, 46, 23, 00, 00; | 37 | Z | Z | Y | Z | Y | Z | Y | Z | Y |
| 61, 25, 00, 00, 00, 00; | 38 | Z | Z | Y | Z | Y | Z | Y | Y | Z |
| 61, 23, 00, 00, 00, 00; | 39 | Z | Z | Y | Z | Y | Z | Y | Y | Y |
| 28, 00, 00, 00, 00, 00; | 40 | Z | Z | Y | Z | Y | Y | Z | Z | Z |
| 22, 00, 00, 00, 00, 00; | 41 | Z | Z | Y | Z | Y | Y | Z | Z | Y |
| 24, 00, 00, 00, 00, 00; | 42 | Z | Z | Y | Z | Y | Y | Z | Y | Z |
| 24, 00, 00, 00, 00, 00; | 43 | Z | Z | Y | Z | Y | Y | Z | Y | Y |
| 21, 13, 00, 00, 00, 00; | 44 | Z | Z | Y | Z | Y | Y | Y | Z | Z |
| 61, 07, 46, 00, 00, 00; | 45 | Z | Z | Y | Z | Y | Y | Y | Z | Y |
| 61, 00, 00, 00, 00, 00; | 46 | Z | Z | Y | Z | Y | Y | Y | Y | Z |
| 61, 00, 00, 00, 00, 00; | 47 | Z | Z | Y | Z | Y | Y | Y | Y | Y |
| 30, 27, 00, 00, 00, 00; | 48 | Z | Z | Y | Y | Y | Z | Z | Z | Z |
| 30, 23, 17, 00, 00, 00; | 49 | Z | Z | Y | Y | Y | Z | Z | Z | Y |
| 30, 25, 00, 00, 00, 00; | 50 | Z | Z | Y | Y | Y | Z | Z | Y | Z |
| 30, 23, 00, 00, 00, 00; | 51 | Z | Z | Y | Y | Y | Z | Z | Y | Y |
| 30, 62, 00, 00, 00, 00; | 52 | Z | Z | Y | Y | Y | Z | Y | Z | Z |
| 30, 07, 46, 23, 00, 00; | 53 | Z | Z | Y | Y | Y | Z | Y | Z | Y |
| 30, 25, 00, 00, 00, 00; | 54 | Z | Z | Y | Y | Y | Z | Y | Y | Z |
| 30, 23, 00, 00, 00, 00; | 55 | Z | Z | Y | Y | Y | Z | Y | Y | Y |
| 30, 56, 00, 00, 00, 00; | 56 | Z | Z | Y | Y | Y | Y | Z | Z | Z |
| 30, 17, 00, 00, 00, 00; | 57 | Z | Z | Y | Y | Y | Y | Z | Z | Y |
| 30, 00, 00, 00, 00, 00; | 58 | Z | Z | Y | Y | Y | Y | Z | Y | Z |
| 30, 00, 00, 00, 00, 00; | 59 | Z | Z | Y | Y | Y | Y | Z | Y | Y |
| 30, 13, 00, 00, 00, 00; | 60 | Z | Z | Y | Y | Y | Y | Y | Z | Z |
| 30, 07, 46, 00, 00, 00; | 61 | Z | Z | Y | Y | Y | Y | Y | Z | Y |
| 30, 00, 00, 00, 00, 00; | 62 | Z | Z | Y | Y | Y | Y | Y | Y | Z |
| 30, 00, 00, 00, 00, 00; | 63 | Z | Z | Y | Y | Y | Y | Y | Y | Y |
| 32, 52, 00, 00, 00, 00; | 64 | Z | Y | Z | Z | Y | Z | Z | Z | Z |
| 34, 35, 00, 00, 00, 00; | 65 | Z | Y | Z | Z | Y | Z | Z | Z | Y |
| 58, 57, 00, 00, 00, 00; | 66 | Z | Y | Z | Z | Y | Z | Z | Y | Z |
| 58, 35, 00, 00, 00, 00; | 67 | Z | Y | Z | Z | Y | Z | Z | Y | Y |
| 36, 37, 00, 00, 00, 00; | 68 | Z | Y | Z | Z | Y | Z | Y | Z | Z |
| 36, 07, 46, 35, 00, 00; | 69 | Z | Y | Z | Z | Y | Z | Y | Z | Y |
| 36, 57, 00, 00, 00, 00; | 70 | Z | Y | Z | Z | Y | Z | Y | Y | Z |
| 36, 35, 00, 00, 00, 00; | 71 | Z | Y | Z | Z | Y | Z | Y | Y | Y |
| 38, 00, 00, 00, 00, 00; | 72 | Z | Y | Z | Z | Y | Y | Z | Z | Z |
| 34, 00, 00, 00, 00, 00; | 73 | Z | Y | Z | Z | Y | Y | Z | Z | Y |

-continued

Neighborhood Lookup Table

| SURFACE STRINGS | ADR | $P_0$ | $P_0$ | $P_2$ | $P_3$ | T | $P_4$ | $P_5$ | $P_6$ | $P_7$ |
|---|---|---|---|---|---|---|---|---|---|---|
| 58, 00, 00, 00, 00, 00; | 74 | Z | Y | Z | Z | Y | Y | Z | Y | Z |
| 58, 00, 00, 00, 00, 00; | 75 | Z | Y | Z | Z | Y | Y | Z | Y | Y |
| 36, 13, 00, 00, 00, 00; | 76 | Z | Y | Z | Z | Y | Y | Y | Z | Z |
| 36, 07, 46, 00, 00, 00; | 77 | Z | Y | Z | Z | Y | Y | Y | Z | Y |
| 36, 00, 00, 00, 00, 00; | 78 | Z | Y | Z | Z | Y | Y | Y | Y | Z |
| 36, 00, 00, 00, 00, 00; | 79 | Z | Y | Z | Z | Y | Y | Y | Y | Y |
| 33, 00, 00, 00, 00, 00; | 80 | Z | Y | Y | Y | Z | Z | Z | Z | Z |
| 17, 35, 00, 00, 00, 00; | 81 | Z | Y | Z | Y | Z | Z | Z | Z | Y |
| 57, 00, 00, 00, 00, 00; | 82 | Z | Y | Z | Y | Z | Z | Z | Y | Z |
| 35, 00, 00, 00, 00, 00; | 83 | Z | Y | Z | Y | Z | Z | Z | Y | Y |
| 37, 00, 00, 00, 00, 00; | 84 | Z | Y | Z | Y | Z | Z | Y | Z | Z |
| 07, 46, 35, 00, 00, 00; | 85 | Z | Y | Z | Y | Z | Z | Y | Z | Y |
| 57, 00, 00, 00, 00, 00; | 86 | Z | Y | Z | Y | Z | Z | Y | Y | Z |
| 35, 00, 00, 00, 00, 00; | 87 | Z | Y | Z | Y | Z | Z | Y | Y | Y |
| 56, 00, 00, 00, 00, 00; | 88 | Z | Y | Z | Y | Z | Y | Z | Z | Z |
| 17, 00, 00, 00, 00, 00; | 89 | Z | Y | Z | Y | Y | Y | Z | Z | Y |
| 00, 00, 00, 00, 00, 00; | 90 | Z | Y | Z | Y | Y | Y | Z | Y | Z |
| 00, 00, 00, 00, 00, 00; | 91 | Z | Y | Z | Y | Y | Y | Z | Y | Y |
| 13, 00, 00, 00, 00, 00; | 92 | Z | Y | Z | Y | Y | Y | Y | Z | Z |
| 07, 46, 00, 00, 00, 00; | 93 | Z | Y | Z | Y | Y | Y | Y | Z | Y |
| 00, 00, 00, 00, 00, 00; | 94 | Z | Y | Z | Y | Y | Y | Y | Y | Z |
| 00, 00, 00, 00, 00, 00; | 95 | Z | Y | Z | Y | Y | Y | Y | Y | Y |
| 32, 21, 00, 00, 00, 00; | 96 | Z | Y | Y | Z | Y | Z | Z | Z | Z |
| 34, 23, 00, 00, 00, 00; | 97 | Z | Y | Y | Z | Y | Z | Z | Z | Y |
| 58, 25, 00, 00, 00, 00; | 98 | Z | Y | Y | Z | Y | Z | Z | Y | Z |
| 58, 23, 00, 00, 00, 00; | 99 | Z | Y | Y | Z | Y | Z | Z | Y | Y |
| 36, 62, 00, 00, 00, 00; | 100 | Z | Y | Y | Z | Y | Z | Y | Z | Z |
| 36, 07, 46, 23, 00, 00; | 101 | Z | Y | Y | Z | Y | Z | Y | Z | Y |
| 36, 25, 00, 00, 00, 00; | 102 | Z | Y | Y | Z | Y | Z | Y | Y | Z |
| 36, 23, 00, 00, 00, 00; | 103 | Z | Y | Y | Z | Y | Z | Y | Y | Y |
| 38, 00, 00, 00, 00, 00; | 104 | Z | Y | Y | Z | Y | Y | Z | Z | Z |
| 34, 00, 00, 00, 00, 00; | 105 | Z | Y | Y | Z | Y | Y | Z | Z | Y |
| 58, 00, 00, 00, 00, 00; | 106 | Z | Y | Y | Z | Y | Y | Z | Y | Z |
| 58, 00, 00, 00, 00, 00; | 107 | Z | Y | Y | Z | Y | Y | Z | Y | Y |
| 36, 13, 00, 00, 00, 00; | 108 | Z | Y | Y | Z | Y | Y | Y | Z | Z |
| 36, 07, 46, 00, 00, 00; | 109 | Z | Y | Y | Z | Y | Y | Y | Z | Y |
| 36, 00, 00, 00, 00, 00; | 110 | Z | Y | Y | Z | Y | Y | Y | Y | Z |
| 36, 00, 00, 00, 00, 00; | 111 | Z | Y | Y | Z | Y | Y | Y | Y | Y |
| 27, 00, 00, 00, 00, 00; | 112 | Z | Y | Y | Y | Z | Z | Z | Z | Z |
| 17, 23, 00, 00, 00, 00; | 113 | Z | Y | Y | Y | Z | Z | Z | Z | Y |
| 25, 00, 00, 00, 00, 00; | 114 | Z | Y | Y | Y | Z | Z | Z | Y | Z |
| 23, 00, 00, 00, 00, 00; | 115 | Z | Y | Y | Y | Z | Z | Z | Y | Y |
| 62, 00, 00, 00, 00, 00; | 116 | Z | Y | Y | Y | Z | Z | Y | Z | Z |
| 07, 46, 23, 00, 00, 00; | 117 | Z | Y | Y | Y | Z | Z | Y | Z | Y |
| 25, 00, 00, 00, 00, 00; | 118 | Z | Y | Y | Y | Z | Z | Y | Y | Z |
| 23, 00, 00, 00, 00, 00; | 119 | Z | Y | Y | Y | Z | Z | Y | Y | Y |
| 56, 00, 00, 00, 00, 00; | 120 | Z | Y | Y | Y | Z | Y | Z | Z | Z |
| 17, 00, 00, 00, 00, 00; | 121 | Z | Y | Y | Y | Z | Y | Z | Z | Y |
| 00, 00, 00, 00, 00, 00; | 122 | Z | Y | Y | Y | Z | Y | Z | Y | Z |
| 00, 00, 00, 00, 00, 00; | 123 | Z | Y | Y | Y | Z | Y | Z | Y | Y |
| 13, 00, 00, 00, 00, 00; | 124 | Z | Y | Y | Y | Z | Y | Y | Z | Z |
| 07, 46, 00, 00, 00, 00; | 125 | Z | Y | Y | Y | Z | Y | Y | Z | Y |
| 00, 00, 00, 00, 00, 00; | 126 | Z | Y | Y | Y | Z | Y | Y | Y | Z |
| 00, 00, 00, 00, 00, 00; | 127 | Z | Y | Y | Y | Y | Y | Y | Y | Y |
| 42, 43, 00, 00, 00, 00; | 128 | Y | Z | Z | Z | Y | Z | Z | Z | Z |
| 60, 59, 00, 00, 00, 00; | 129 | Y | Z | Z | Z | Y | Z | Z | Z | Y |
| 44, 40, 00, 00, 00, 00; | 130 | Y | Z | Z | Z | Y | Z | Z | Y | Z |
| 44, 59, 00, 00, 00, 00; | 131 | Y | Z | Z | Z | Y | Z | Z | Y | Y |
| 39, 31, 00, 00, 00, 00; | 132 | Y | Z | Z | Z | Y | Z | Y | Z | Z |
| 39, 07, 46, 59, 00, 00; | 133 | Y | Z | Z | Z | Y | Z | Y | Z | Y |
| 39, 40, 00, 00, 00, 00; | 134 | Y | Z | Z | Z | Y | Z | Y | Y | Z |
| 39, 59, 00, 00, 00, 00; | 135 | Y | Z | Z | Z | Y | Z | Y | Y | Y |
| 29, 11, 00, 00, 00, 00; | 136 | Y | Z | Z | Z | Y | Y | Z | Z | Z |
| 60, 11, 00, 00, 00, 00; | 137 | Y | Z | Z | Z | Y | Y | Z | Z | Y |
| 44, 11, 00, 00, 00, 00; | 138 | Y | Z | Z | Z | Y | Y | Z | Y | Z |
| 44, 11, 00, 00, 00, 00; | 139 | Y | Z | Z | Z | Y | Y | Z | Y | Y |
| 39, 13, 11, 00, 00, 00; | 140 | Y | Z | Z | Z | Y | Y | Y | Z | Z |
| 39, 07, 46, 11, 00, 00; | 141 | Y | Z | Z | Z | Y | Y | Y | Z | Y |
| 39, 11, 00, 00, 00, 00; | 142 | Y | Z | Z | Z | Y | Y | Y | Y | Z |
| 39, 11, 00, 00, 00, 00; | 143 | Y | Z | Z | Z | Y | Y | Y | Y | Y |
| 19, 00, 00, 00, 00, 00; | 144 | Y | Z | Z | Y | Z | Z | Z | Z | Z |
| 17, 59, 00, 00, 00, 00; | 145 | Y | Z | Z | Y | Z | Z | Z | Z | Y |
| 40, 00, 00, 00, 00, 00; | 146 | Y | Z | Z | Y | Z | Z | Z | Y | Z |
| 59, 00, 00, 00, 00, 00; | 147 | Y | Z | Z | Y | Z | Z | Z | Y | Y |
| 31, 00, 00, 00, 00, 00; | 148 | Y | Z | Z | Y | Y | Z | Y | Z | Z |
| 07, 46, 59, 00, 00, 00; | 149 | Y | Z | Z | Y | Y | Z | Y | Z | Y |
| 40, 00, 00, 00, 00, 00; | 150 | Y | Z | Z | Y | Y | Z | Y | Y | Y |
| 59, 00, 00, 00, 00, 00; | 151 | Y | Z | Z | Y | Y | Z | Y | Y | Y |
| 11, 56, 00, 00, 00, 00; | 152 | Y | Z | Z | Y | Y | Y | Z | Z | Z |
| 17, 11, 00, 00, 00, 00; | 153 | Y | Z | Z | Y | Y | Y | Z | Z | Y |
| 11, 00, 00, 00, 00, 00; | 154 | Y | Z | Z | Y | Y | Y | Z | Y | Z |
| 11, 00, 00, 00, 00, 00; | 155 | Y | Z | Z | Y | Y | Y | Z | Y | Y |
| 13, 11, 00, 00, 00, 00; | 156 | Y | Z | Z | Y | Y | Y | Y | Z | Z |
| 07, 46, 11, 00, 00, 00; | 157 | Y | Z | Z | Y | Y | Y | Y | Z | Y |
| 11, 00, 00, 00, 00, 00; | 158 | Y | Z | Z | Y | Y | Y | Y | Y | Z |
| 11, 00, 00, 00, 00, 00; | 159 | Y | Z | Z | Y | Y | Y | Y | Y | Y |
| 45, 08, 26, 47, 00, 00; | 160 | Y | Z | Y | Z | Y | Z | Z | Z | Z |
| 60, 08, 26, 23, 00, 00; | 161 | Y | Z | Y | Z | Y | Z | Z | Z | Y |
| 44, 08, 26, 25, 00, 00; | 162 | Y | Z | Y | Z | Y | Z | Z | Y | Z |
| 44, 08, 26, 23, 00, 00; | 163 | Y | Z | Y | Z | Y | Z | Z | Y | Y |
| 39, 08, 26, 62, 00, 00; | 164 | Y | Z | Y | Z | Y | Z | Y | Z | Z |
| 39, 08, 26, 07, 46, 23; | 165 | Y | Z | Y | Z | Y | Z | Y | Z | Y |
| 39, 08, 26, 25, 00, 00; | 166 | Y | Z | Y | Z | Y | Z | Y | Y | Z |
| 39, 08, 26, 23, 00, 00; | 167 | Y | Z | Y | Z | Y | Z | Y | Y | Y |
| 29, 08, 26, 00, 00, 00; | 168 | Y | Z | Y | Z | Y | Y | Z | Z | Z |
| 60, 08, 26, 00, 00, 00; | 169 | Y | Z | Y | Z | Y | Y | Z | Z | Y |
| 44, 08, 26, 00, 00, 00; | 170 | Y | Z | Y | Z | Y | Y | Z | Y | Z |
| 44, 08, 26, 00, 00, 00; | 171 | Y | Z | Y | Z | Y | Y | Z | Y | Y |
| 39, 08, 26, 13, 00, 00; | 172 | Y | Z | Y | Z | Y | Y | Y | Z | Z |
| 39, 08, 26, 07, 46, 00; | 173 | Y | Z | Y | Z | Y | Y | Y | Z | Y |
| 39, 08, 26, 00, 00, 00; | 174 | Y | Z | Y | Z | Y | Y | Y | Y | Z |
| 39, 08, 26, 00, 00, 00; | 175 | Y | Z | Y | Z | Y | Y | Y | Y | Y |
| 08, 26, 27, 00, 00, 00; | 176 | Y | Z | Y | Y | Z | Z | Z | Z | Z |
| 08, 26, 17, 23, 00, 00; | 177 | Y | Z | Y | Y | Z | Z | Z | Z | Y |
| 08, 26, 25, 00, 00, 00; | 178 | Y | Z | Y | Y | Z | Z | Z | Y | Z |
| 08, 26, 23, 00, 00, 00; | 179 | Y | Z | Y | Y | Z | Z | Z | Y | Y |
| 08, 26, 62, 00, 00, 00; | 180 | Y | Z | Y | Y | Z | Z | Y | Z | Z |
| 08, 26, 07, 46, 23, 00; | 181 | Y | Z | Y | Y | Z | Z | Y | Z | Y |
| 08, 26, 25, 00, 00, 00; | 182 | Y | Z | Y | Y | Z | Z | Y | Y | Z |
| 08, 26, 23, 00, 00, 00; | 183 | Y | Z | Y | Y | Z | Z | Y | Y | Y |
| 08, 26, 56, 00, 00, 00; | 184 | Y | Z | Y | Y | Z | Y | Z | Z | Z |
| 08, 26, 17, 00, 00, 00; | 185 | Y | Z | Y | Y | Z | Y | Z | Z | Y |
| 08, 26, 00, 00, 00, 00; | 186 | Y | Z | Y | Y | Z | Y | Z | Y | Z |
| 08, 26, 00, 00, 00, 00; | 187 | Y | Z | Y | Y | Z | Y | Z | Y | Y |
| 08, 26, 13, 00, 00, 00; | 188 | Y | Z | Y | Y | Z | Y | Y | Z | Z |
| 08, 26, 07, 46, 00, 00; | 189 | Y | Z | Y | Y | Z | Y | Y | Z | Y |
| 08, 26, 00, 00, 00, 00; | 190 | Y | Z | Y | Y | Z | Y | Y | Y | Z |
| 08, 26, 00, 00, 00, 00; | 191 | Y | Z | Y | Y | Y | Y | Y | Y | Y |
| 42, 52, 00, 00, 00, 00; | 192 | Y | Y | Z | Z | Y | Z | Z | Z | Z |
| 60, 35, 00, 00, 00, 00; | 193 | Y | Y | Z | Z | Y | Z | Z | Z | Y |
| 44, 57, 00, 00, 00, 00; | 194 | Y | Y | Z | Z | Y | Z | Z | Y | Z |
| 44, 35, 00, 00, 00, 00; | 195 | Y | Y | Z | Z | Y | Z | Z | Y | Y |
| 39, 37, 00, 00, 00, 00; | 196 | Y | Y | Z | Z | Y | Z | Y | Z | Z |
| 39, 07, 46, 35, 00, 00; | 197 | Y | Y | Z | Z | Y | Z | Y | Z | Y |
| 39, 57, 00, 00, 00, 00; | 198 | Y | Y | Z | Z | Y | Z | Y | Y | Z |
| 39, 35, 00, 00, 00, 00; | 199 | Y | Y | Z | Z | Y | Z | Y | Y | Y |
| 29, 00, 00, 00, 00, 00; | 200 | Y | Y | Z | Z | Y | Y | Z | Z | Z |
| 60, 00, 00, 00, 00, 00; | 201 | Y | Y | Z | Z | Y | Y | Z | Z | Y |
| 44, 00, 00, 00, 00, 00; | 202 | Y | Y | Z | Z | Y | Y | Z | Y | Z |
| 44, 00, 00, 00, 00, 00; | 203 | Y | Y | Z | Z | Y | Y | Z | Y | Y |
| 39, 13, 00, 00, 00, 00; | 204 | Y | Y | Z | Z | Y | Y | Y | Z | Z |
| 39, 07, 46, 00, 00, 00; | 205 | Y | Y | Z | Z | Y | Y | Y | Z | Y |
| 39, 00, 00, 00, 00, 00; | 206 | Y | Y | Z | Z | Y | Y | Y | Y | Z |
| 39, 00, 00, 00, 00, 00; | 207 | Y | Y | Z | Z | Y | Y | Y | Y | Y |
| 33, 00, 00, 00, 00, 00; | 208 | Y | Y | Z | Z | Y | Z | Z | Z | Z |
| 17, 35, 00, 00, 00, 00; | 209 | Y | Y | Z | Y | Z | Z | Z | Z | Y |
| 57, 00, 00, 00, 00, 00; | 210 | Y | Y | Z | Y | Z | Z | Z | Y | Z |
| 35, 00, 00, 00, 00, 00; | 211 | Y | Y | Z | Y | Z | Z | Z | Y | Y |
| 37, 00, 00, 00, 00, 00; | 212 | Y | Y | Z | Y | Z | Z | Y | Z | Z |
| 07, 46, 35, 00, 00, 00; | 213 | Y | Y | Z | Y | Z | Z | Y | Z | Y |
| 57, 00, 00, 00, 00, 00; | 214 | Y | Y | Z | Y | Z | Z | Y | Y | Z |
| 35, 00, 00, 00, 00, 00; | 215 | Y | Y | Z | Y | Z | Z | Y | Y | Y |
| 56, 00, 00, 00, 00, 00; | 216 | Y | Y | Z | Y | Z | Y | Z | Z | Z |
| 17, 00, 00, 00, 00, 00; | 217 | Y | Y | Z | Y | Z | Y | Z | Z | Y |
| 00, 00, 00, 00, 00, 00; | 218 | Y | Y | Z | Y | Z | Y | Z | Y | Z |
| 00, 00, 00, 00, 00, 00; | 219 | Y | Y | Z | Y | Z | Y | Z | Y | Y |
| 13, 00, 00, 00, 00, 00; | 220 | Y | Y | Z | Y | Z | Y | Y | Z | Z |
| 07, 46, 00, 00, 00, 00; | 221 | Y | Y | Z | Y | Z | Y | Y | Z | Y |

-continued

Neighborhood Lookup Table

| SURFACE STRINGS | ADR $P_0$ | $P_0$ | $P_2$ | $P_3$ | T | $P_4$ | $P_5$ | $P_6$ | $P_7$ |
|---|---|---|---|---|---|---|---|---|---|
| 00, 00, 00, 00, 00, 00; | 222 | Y | Y | Z | Y | Y | Y | Y | Y | Z |
| 00, 00, 00, 00, 00, 00; | 223 | Y | Y | Z | Y | Y | Y | Y | Y |
| 45, 47, 00, 00, 00, 00; | 224 | Y | Y | Y | Z | Y | Z | Z | Z | Z |
| 60, 23, 00, 00, 00, 00; | 225 | Y | Y | Y | Z | Y | Z | Z | Z | Y |
| 44, 25, 00, 00, 00, 00; | 226 | Y | Y | Y | Z | Y | Z | Z | Y | Z |
| 44, 23, 00, 00, 00, 00; | 227 | Y | Y | Y | Z | Y | Z | Z | Y | Y |
| 39, 62, 00, 00, 00, 00; | 228 | Y | Y | Y | Z | Y | Z | Y | Z | Z |
| 39, 07, 46, 23, 00, 00; | 229 | Y | Y | Y | Z | Y | Z | Y | Z | Y |
| 39, 25, 00, 00, 00, 00; | 230 | Y | Y | Y | Z | Y | Z | Y | Y | Z |
| 39, 23, 00, 00, 00, 00; | 231 | Y | Y | Y | Z | Y | Z | Y | Y | Y |
| 29, 00, 00, 00, 00, 00; | 232 | Y | Y | Y | Z | Y | Y | Z | Z | Z |
| 60, 00, 00, 00, 00, 00; | 233 | Y | Y | Y | Z | Y | Y | Z | Z | Y |
| 44, 00, 00, 00, 00, 00; | 234 | Y | Y | Y | Z | Y | Y | Z | Y | Z |
| 44, 00, 00, 00, 00, 00; | 235 | Y | Y | Y | Z | Y | Y | Z | Y | Y |
| 39, 13, 00, 00, 00, 00; | 236 | Y | Y | Y | Z | Y | Y | Y | Z | Z |
| 39, 07, 46, 00, 00, 00; | 237 | Y | Y | Y | Z | Y | Y | Y | Z | Y |
| 39, 00, 00, 00, 00, 00; | 238 | Y | Y | Y | Z | Y | Y | Y | Y | Z |
| 39, 00, 00, 00, 00, 00; | 239 | Y | Y | Y | Z | Y | Y | Y | Y | Y |
| 27, 00, 00, 00, 00, 00; | 240 | Y | Y | Y | Y | Y | Z | Z | Z | Z |
| 17, 23, 00, 00, 00, 00; | 241 | Y | Y | Y | Y | Y | Z | Z | Z | Y |
| 25, 00, 00, 00, 00, 00; | 242 | Y | Y | Y | Y | Y | Z | Z | Y | Z |
| 23, 00, 00, 00, 00, 00; | 243 | Y | Y | Y | Y | Y | Z | Z | Y | Y |
| 62, 00, 00, 00, 00, 00; | 244 | Y | Y | Y | Y | Y | Z | Y | Z | Z |
| 07, 46, 23, 00, 00, 00; | 245 | Y | Y | Y | Y | Y | Z | Y | Z | Y |
| 25, 00, 00, 00, 00, 00; | 246 | Y | Y | Y | Y | Y | Z | Y | Y | Z |
| 23, 00, 00, 00, 00, 00; | 247 | Y | Y | Y | Y | Y | Z | Y | Y | Y |
| 56, 00, 00, 00, 00, 00; | 248 | Y | Y | Y | Y | Y | Y | Z | Z | Z |
| 17, 00, 00, 00, 00, 00; | 249 | Y | Y | Y | Y | Y | Y | Z | Z | Y |
| 00, 00, 00, 00, 00, 00; | 250 | Y | Y | Y | Y | Y | Y | Z | Y | Z |
| 00, 00, 00, 00, 00, 00; | 251 | Y | Y | Y | Y | Y | Y | Z | Y | Y |
| 13, 00, 00, 00, 00, 00; | 252 | Y | Y | Y | Y | Y | Y | Y | Z | Z |
| 07, 46, 00, 00, 00, 00; | 253 | Y | Y | Y | Y | Y | Y | Y | Z | Y |
| 00, 00, 00, 00, 00, 00; | 254 | Y | Y | Y | Y | Y | Y | Y | Y | Z |
| 00, 00, 00, 00, 00, 00; | 255 | Y | Y | Y | Y | Y | Y | Y | Y | Y |

In the above table, the Y and Z color values for the neighborhood cells are shown in the right hand columns. The corresponding binary address represented by a particular color combination of the permitter cells $P_{0-7}$ is shown in the middle column denoted ADR. In other words, each of the 256 possible color combinations for the perimeter cells $P_{0-7}$ generates a binary addresses into the neighborhood lookup table 36. For each color combination or address, the neighborhood lookup table 36 outputs a string ID for up to six different surface strings as shown in the left column (as describe below, there are 62 different surface strings). The ordering of the surface strings in each entry of the above table is significant. As explained below, the surface strings are linked together into a border string sequence; by ordering the surface strings as shown in each entry of the above table, the linking process is simplified.

Figure 4A:
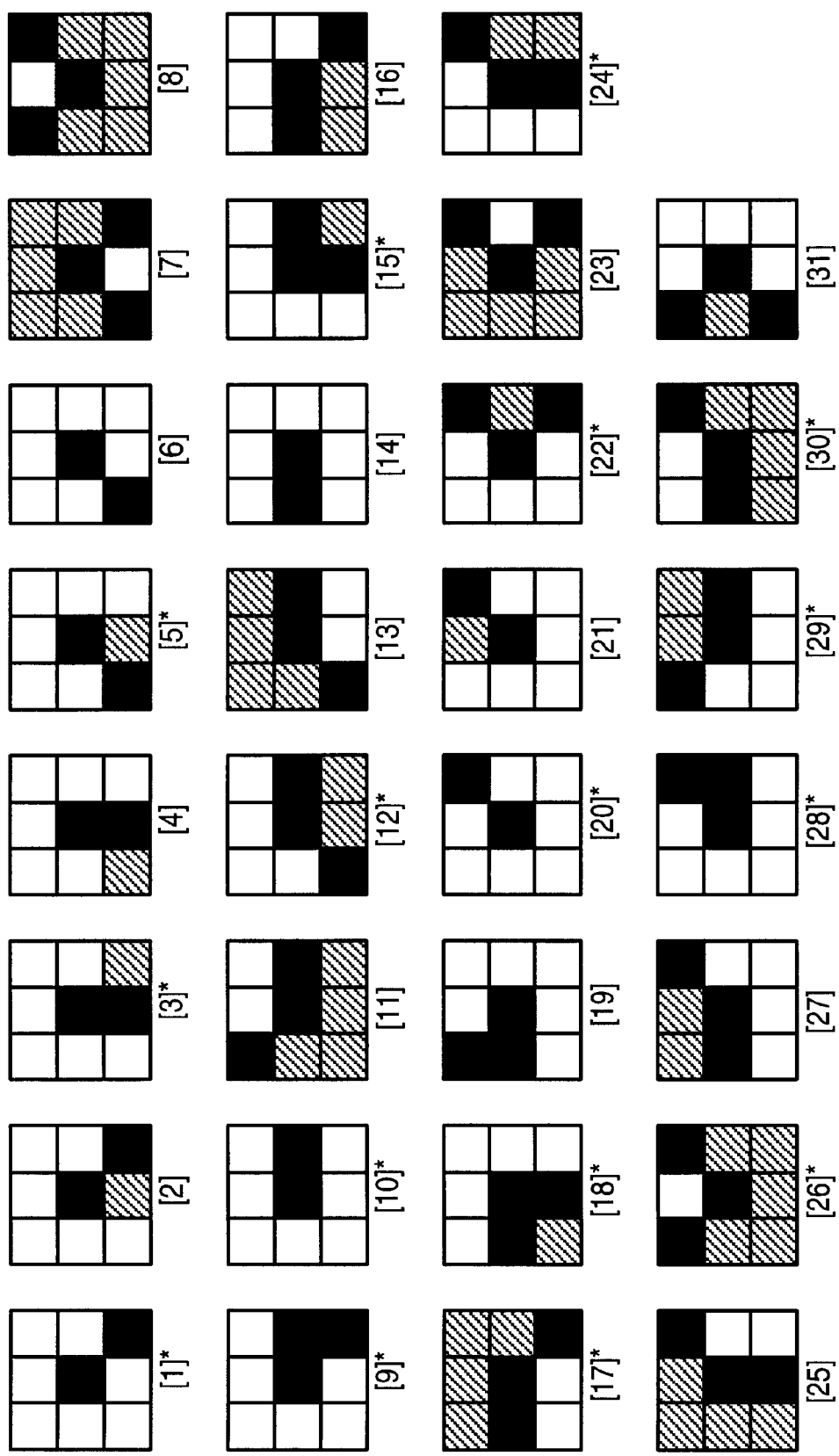
FIGS. 4A and 4B show a set of surface strings corresponding to a neighborhood of cells representing pixels of the raster image, wherein the surface strings are connected into a border string sequence to define a color border.
Figure 4B:
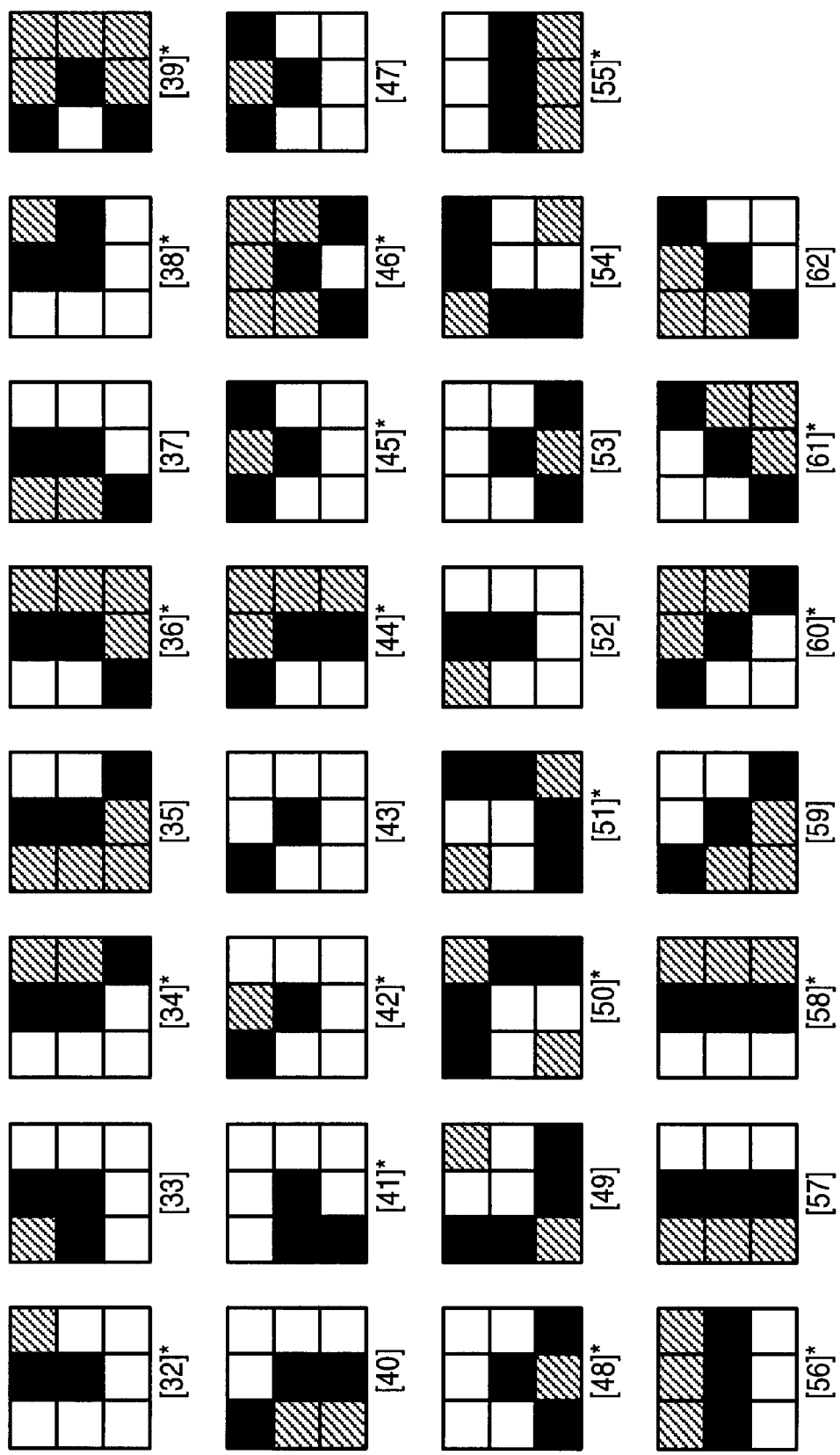

A surface string defines the general slope of a color border passing through a given neighborhood of cells. It is possible that six different color borders will pass through a single neighborhood of cells which is why the neighborhood lookup table 36 outputs up to six different surface strings for any given neighborhood 34. FIGS. 4A and 4B show the 62 different surface strings provided in the present invention which, as far as is known to the applicant, define every possible permutation of a color border in a raster image. The 62 surface strings shown in FIGS. 4A and 4B were generated through an exhaustive, heuristic search that required many man hours to complete; the set of surface strings in FIGS. 4A and 4B is a significant aspect of the present invention.

The cell coloring in each surface string shown in FIGS. 4A and 4B denotes the above-described color value (Y or Z) for each cell. The black cells represent the color Y, the white cells represent the color Z, and the shaded cells represent the color X which means the color of the cell is ignored (i.e., the cell color could be either Y or Z). Referring again to the above neighborhood lookup table, the entry corresponding to neighborhood address 69 is:

| SURFACE STRINGS | ADR $P_0$ | $P_0$ | $P_2$ | $P_3$ | T | $P_4$ | $P_5$ | $P_6$ | $P_7$ |
|---|---|---|---|---|---|---|---|---|---|
| 36, 07, 46, 35, 00, 00; | 69 | Z | Y | Z | Z | Y | Z | Y | Z | Y |

The color code for the first surface string of the above entry, surface string 36, is shown in FIG. 4B to be:

$$Z\ X\ Y | Z\ X\ Y | Y\ X\ X.$$

Note that the color code for surface string 36 matches the color code of the neighborhood address 69 except for the don't care color X. A similar color code which matches the color code of neighborhood 69 can be verified for each of the other surface strings (7, 46 and 35) in the above entry.

Each surface string shown in FIGS. 4A and 4B has associated with it a receive slope and a send slope which define the general slope of a color border as it enters the neighborhood and the general slope as it exits the neighborhood. In the present invention, there are eight possible slope values that can be assigned to the send and receive slope of a surface string. These slope values (1–8) are illustrated in FIG. 5B. Notice that there are two slope values assigned to each slope direction: diagonal, vertical, and horizontal, e.g., the slope values 1 and 2 are assigned to the diagonal direction downward from left to right. The reason two slope values are assigned to each direction is because each color border is either an east or west border.

Figure 6A:
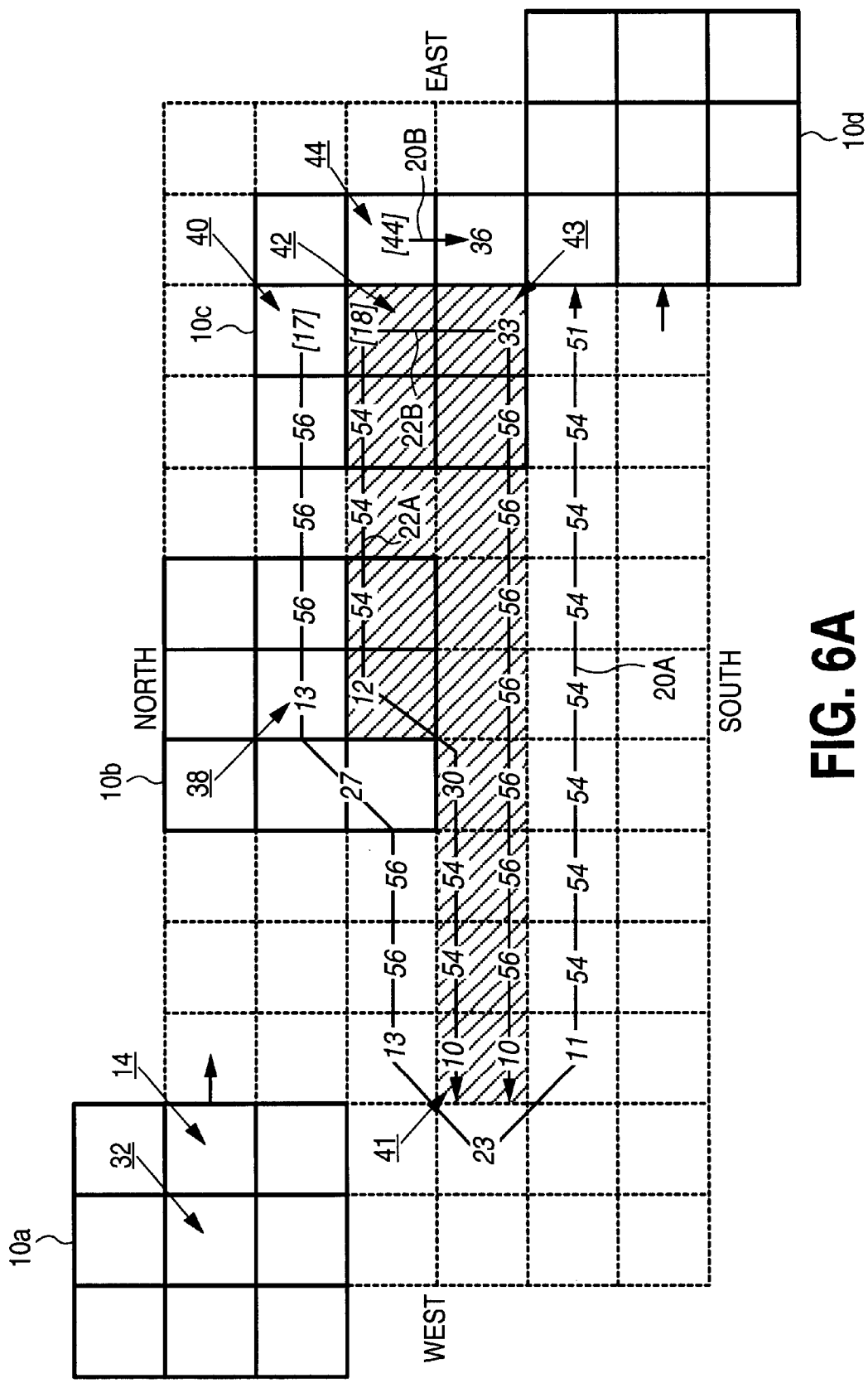
FIG. 6A shows a color raster image comprising a simple feature and the corresponding border string sequences.

The concept of east and west color borders is understood from the raster image comprising a simple feature as shown in FIG. 6A. This raster image comprises only two colors, black and white. The feature depicted in the image has associated with it a west 20A and an east 20B white color border, and a west 22A and an east 22B black color border. The west white border corresponding to the east white border 20A is the left edge of the image in FIG. 6A, and the east white border corresponding to the west white border 20B is the right edge of the image in FIG. 6A. Notice that in FIG. 6A the west and east borders begin in pairs, which is always the case in the present invention. West and east borders also always end in pairs, although the borders do not always end with the respective border that it began with. As described in greater detail below, surface strings are generated for both the west and east borders, but the tags for generating vectors are placed only on either of the west or east borders. Both west and east border string sequences are used to place the tags, but the tags are placed only on either the west or east borders.

Referring again to the surface strings shown in FIGS. 4A and 4B, the receive and send slope of each surface string is assigned one of the values shown in FIG. 5B. Consider, for example, the eleventh surface string [11]. This surface string is assigned a receive slope of 2 and a send slope of 7. Similarly, the surface string [17] is assigned a receive slope of 8 and a send slope of 1. As explained in greater detail below, the receive and send slopes are used to connect the surface strings into a border string sequence which represents a color border in the image. The first surface string [1] is assigned a receive slope of 0 because string sequences start with this surface string. Similarly, the surface string [8] is assigned a send slope of 0 because string sequences end with this surface string. A lookup table showing each of the 62 surface strings and their corresponding receive and send slopes is shown below:

Surface Strings Table

| $P_0$ | $P_1$ | $P_2$ | $P_3$ | T | $P_4$ | $P_5$ | $P_6$ | $P_7$ | Strg ID | Rcv Slp | Snd Slp |
|---|---|---|---|---|---|---|---|---|---|---|---|
| Z | Z | Z | Z | Y | Z | Z | Z | Y | 01 | 0 | 1 |
| Z | Z | Z | Z | Y | Z | Z | X | Y | 02 | 0 | 2 |
| Z | Z | Z | Z | Y | Z | Z | Y | X | 03 | 0 | 3 |
| Z | Z | Z | Z | Y | Z | X | Y | Z | 04 | 0 | 4 |
| Z | Z | Z | Z | Y | Z | Y | X | Z | 05 | 0 | 5 |
| Z | Z | Z | Z | Y | Z | Y | Z | Z | 06 | 0 | 6 |
| X | X | X | X | Y | X | Y | Z | Y | 07 | 0 | 6 |
| Y | Z | Y | X | Y | X | X | X | X | 08 | 2 | 0 |
| Z | Z | Z | Z | Y | Y | Z | Z | Y | 09 | 9 | 1 |
| Z | Z | Z | Z | Y | Y | Z | Z | Z | 10 | 9 | 8 |
| Y | Z | Z | X | Y | Y | X | X | X | 11 | 2 | 7 |
| Z | Z | Z | Z | Y | Y | Y | X | X | 12 | 9 | 5 |
| X | X | X | X | Y | Y | Y | Z | Z | 13 | 10 | 6 |
| Z | Z | Z | Y | Y | Z | Z | Z | Z | 14 | 7 | 10 |
| Z | Z | Z | Z | Y | Y | Z | Y | X | 15 | 9 | 3 |
| Z | Z | Z | Y | Y | Z | X | X | Y | 16 | 7 | 2 |
| X | X | X | Y | Y | X | Z | Z | Y | 17 | 8 | 1 |
| Z | Z | Z | Y | Y | Z | X | Y | Z | 18 | 7 | 4 |
| Y | Z | Z | Y | Y | Z | Z | Z | Z | 19 | 2 | 10 |
| Z | Z | Y | Z | Y | Z | Z | Z | Z | 20 | 5 | 0 |
| Z | X | Y | Z | Y | Z | Z | Z | Z | 21 | 6 | 0 |
| Z | Z | Y | Z | Y | X | Z | Z | Y | 22 | 5 | 1 |
| X | X | Y | X | Y | Z | X | X | Y | 23 | 6 | 2 |
| Z | Z | Y | Z | Y | X | Z | Y | X | 24 | 5 | 3 |
| X | X | Y | X | Y | Z | X | Y | Z | 25 | 6 | 4 |
| Y | Z | Y | X | Y | X | X | X | X | 26 | 5 | 0 |
| X | X | Y | Y | Y | Z | Z | Z | Z | 27 | 6 | 10 |
| Z | Z | Y | Z | Y | Y | Z | Z | Z | 28 | 5 | 8 |
| Y | X | X | Z | Y | Y | Z | Z | Z | 29 | 1 | 8 |
| Z | Z | Y | Y | Y | X | X | X | X | 30 | 5 | 9 |
| Y | Z | Z | X | Y | Z | Y | Z | Z | 31 | 2 | 6 |
| Z | Y | X | Z | Y | Z | Z | Z | Z | 32 | 3 | 0 |
| X | Y | Z | Y | Y | Z | Z | Z | Z | 33 | 4 | 10 |
| Z | Y | X | Z | Y | X | Z | Z | Y | 34 | 3 | 1 |
| X | Y | Z | X | Y | Z | X | X | Y | 35 | 4 | 2 |
| Z | Y | X | Z | Y | X | Y | X | X | 36 | 3 | 5 |
| X | Y | Z | X | Y | Z | Y | Z | Z | 37 | 4 | 6 |
| Z | Y | X | Z | Y | Y | Z | Z | Z | 38 | 3 | 8 |
| Y | X | X | Z | Y | X | Y | X | X | 39 | 1 | 5 |
| Y | Z | Z | X | Y | X | Z | Y | Z | 40 | 2 | 4 |
| Z | Z | Z | Y | Y | Z | Y | Z | Z | 41 | 7 | 6 |
| Y | X | Z | Z | Y | Z | Z | Z | Z | 42 | 1 | 0 |
| Y | Z | Z | Z | Y | Z | Z | Z | Z | 43 | 2 | 0 |
| Y | X | X | Z | Y | X | Z | Y | X | 44 | 1 | 3 |
| Y | X | Y | Z | Y | Z | Z | Z | Z | 45 | 2 | 2 |
| X | X | X | X | Y | X | Y | Z | Y | 46 | 0 | 1 |
| Y | X | Y | Z | Y | Z | Z | Z | Z | 47 | 1 | 1 |
| Z | Z | Z | Z | Y | Z | Y | X | Y | 48 | 6 | 0 |
| Y | Z | X | Z | Y | Y | Y | Y | Y | 49 | 4 | 7 |
| Y | Y | Y | Z | Z | Y | X | Z | Y | 50 | 8 | 3 |
| X | Z | Y | Z | Y | Y | Y | Y | Y | 51 | 3 | 9 |
| X | Y | Z | Z | Y | Z | Z | Z | Z | 52 | 4 | 0 |
| Z | Z | Z | Z | Y | Z | Y | X | Y | 53 | 5 | 5 |
| Y | Y | Y | Y | Z | Z | Y | Y | X | 54 | 7 | 7 |
| Z | Z | Z | Y | Y | Y | X | X | X | 55 | 10 | 4 |
| X | X | X | Y | Y | Y | Z | Z | Z | 56 | 8 | 8 |
| X | Y | Z | X | Y | Z | X | Y | Z | 57 | 4 | 4 |
| Z | Y | X | Z | Y | X | Y | X | X | 58 | 3 | 3 |
| Y | Z | Z | X | Y | X | X | X | Y | 59 | 2 | 2 |
| Y | X | X | Z | Y | X | Z | Z | Y | 60 | 1 | 1 |
| Z | Z | Y | Z | Y | Y | X | X | X | 61 | 5 | 5 |
| X | X | Y | X | Y | Z | Y | Z | Z | 62 | 6 | 6 |

In the above table, the left columns represent the color code for each surface string shown in FIGS. 4A and 4B, the middle column is a string ID, and the right columns are the respective receive and send slopes assigned to each surface string. Note that in the above surface strings table there are entries which comprise slopes of 9 and 10. These slopes correspond to the horizontal slopes of 7 and 8 shown in FIG. 5B, only the direction of the slopes are reversed for sequencing surface strings from east to west as described below.

Referring again to FIG. 3, each of the surface string IDs 29 output by the neighborhood lookup table 36 are used as an address into the surface strings table 31 shown above. Notice that surface strings 49, 50, 51 and 55 in the above table are special cases; they are not output by the neighborhood lookup table 36 but instead are I10 generated by combining adjacent surface strings according to the following table:

Special Case Surface Strings Table

| Special Case Strings | Surface Strings Combination |
|---|---|
| 49 | 35, 11 |
| 50 | 17, 44 |
| 51 | 36, 30 |
| 54 | 13, 25 |

In the above table, the special case surface strings are generated when the string sequencer 33 of FIG. 3 encounters two adjacent surface strings which make up a special case surface string. An example of when a special case surface string is generated is described below with reference to FIG. 6A.

The surface strings table 31 outputs the receive and send slope 35 for each surface string ID 29 output by the neighborhood lookup table 36. The string sequencer 33 then uses the pixel location 37 of the current target pixel, the surface string IDs 29, and the surface string slopes 35 to generate border string sequences 6 which define the color borders of the raster image. A border string sequence 6 comprises a sequence of connected surface string IDs 35 in an order that follows the contour of the color border. An example of a border string sequence 6 is shown in FIG. 3 as comprising the following sequence of surface string IDs: 44→34→44→39. Note that from the above surface strings table and the slopes shown in FIG. 5B, the receive and send slopes of the surface strings in this sequence match. For example, the send slope of string [44] is 3, and the receive slope of string [34] is 3. Referring again to the above neighborhood lookup table, the surface strings in each entry are listed in a particular order such that when the string sequencer 33 processes the surface strings at a given pixel, the surface strings are automatically linked into to the appropriate string sequences without having to check that the send and receive slopes match.

The operation of the string sequencer 33 is understood with reference to FIG. 6A which shows a black and white raster image comprising a simple black feature and the corresponding border string sequences that are generated by the present invention. As described above, the neighborhood scanner 28 of FIG. 3 scans a 3×3 neighborhood of cells 10a through the image starting with the first pixel 12. Thus, for the first pixel 12 no surface strings are generated by the neighborhood lookup table 36 because the color code for the neighborhood of cells 10a (YYY YYY YYY) corresponds to address 255 in the above neighborhood lookup table, which has no surface strings for that entry. In fact, a surface string is not generated until the neighborhood of cells reaches pixel 38 where the color code for the neighborhood of cells 10b is (YYY YYY YZZ) corresponding to address 252 in the above neighborhood lookup table which comprises only surface string [13] in that entry. That surface string [13] is the correct and only surface string for this neighborhood 10b can be verified by examining the colors of the neighborhood 10b in FIG. 6A with the colors of surface string [13] shown in FIGS. 4A and 4B. As described above, the surface string [13] indexes the surface strings table 31 of FIG. 3 which outputs the corresponding receive and send slopes of 10 and 6. The string sequencer 33 processes the location of the pixel 37, the surface string ID[13] 29, and the receive and send slopes 35 in order to sequence the east white border 20A in FIG. 6A. As explained in greater detail below, there are specific priorities that establish where to begin and end a border string sequence. In FIG. 6A, the east white border 20A starts with pixel 40 based on these priorities, and sequences around the black feature resulting in a border string sequence of:

17→56→56→56→13→ . . . →51.

The last surface string in the above sequence (surface string [51]) is a "corner" surface string which ends the current border string sequence. A border string sequence is generated for the black west border 22A starting at pixel 42 and sequencing around the black feature resulting in a border string sequence of:

18→54→54→54→12→ . . . →10.

The above border string sequence 22A ends at pixel 41 because surface string [10] is a "protruding corner" surface string which has priority over the "corner" surface string at pixel 43. The surface string priorities are described in greater detail below. When the neighborhood 10c reaches target pixel 42, it begins a border string sequence for both the west black border 22A and the east black border 22B. Thus, the resulting border string sequence for the east black border 22B is:

18→33→56→56→ . . . →10.

Similarly, when the neighborhood of cells reaches target pixel 44, the string sequencer 33 begins the border string sequence for the west white border 20B and generates the simple string sequence of 44→36.

How the string sequencer 33 of FIG. 3 determines which pixel to begin and end a border string sequence is also a significant aspect of the present invention. Basically, the string sequencer 33 operates according to a set of priority rules which are shown in the following table:

| Priority Rules | |
| --- | --- |
| Surface String | Priority |
| North over South | Highest |
| Protruding Corner | Second Highest |
| Corner | Third Highest |
| Step | Fourth Highest |
| West over East | Lowest |

What the above priority rules mean is that a border string sequence will always begin with the surface string representing the most northern pixel and sequence from north to south. If two surface strings represent pixels at the same latitude, then the surface string's type determines the priority. In the above table, "protruding corner" surface strings, which in FIGS. 4A and 4B are surface strings [9], [10], [14], [19], [28], and [41], have the next highest priority. Next in priority are "corner" surface strings which in FIGS. 4A and 4B are surface strings [15], [18], [33], and [38], followed by "step" corner strings which in FIG. 4A are surface strings [13], [17], [27], and [29]. The special case surface strings [49], [50], [51] and [54] discussed above are also all corner surface strings. Finally, the lowest priority is to start border string sequences with surface strings representing western pixels over eastern pixels. In other words, if two surface strings of the same type represent pixels at the same latitude, then the western surface string has priority over the eastern surface string and the sequencing will progress from west to east.

These priority rules can be understood with reference to FIG. 6A. In evaluating the surface strings of the east white border 20A, the string sequencer 33 of FIG. 3 will begin the border string sequence with surface string [17] representing pixel 40 because it is the most northern surface string, and because it is a corner surface string which has priority over the step surface string [13] d representing pixel 38. Surface string [17] at pixel 40 is considered a corner surface string because it is adjacent to surface string [44] and the combination of [17] and [44] results in the special case surface string [50] according to the above table (again, the special case surface strings are all corner surface strings).

Thus, when the string sequencer 33 encounters pixel 38, it begins to build a string sequence starting with the step surface string [13] and sequencing from west to east. However, when the string sequencer 33 encounters pixel 40, the string sequence is reversed so that it begins with surface string [17] and sequences from east to west. The border string sequence for the east white border 20A continues sequencing around the black feature as shown in FIG. 6A until it reaches surface string [30]. Surface string [30] ends the border string sequence because when combined with surface string [36] of the west white border 20B it forms the special case surface string [51] which is a corner surface string. Similarly, the border string sequence for the west black border 22A begins with surface string [18] at pixel 42 because it is a corner surface string which has priority over step surface string [12]. The string sequence 22A ends at pixel 41 because surface string [10] is a protruding corner surface string which has priority over the corner surface string [33] at pixel 43. String sequences always end with the highest priority surface string, where east ending surface strings have priority over west ending surface strings.

The string sequencer 33 generates border string sequences for both the east and west borders for each feature in the image. However, it has been determined that the vectors can be generated by placing tags only on one of the east or west borders. Both the west and east border string sequences are used to place the tags, but the tags are placed only on one of the west or east borders. The 32 surface strings identified by an * in FIGS. 4A and 4B are surface strings that can be part of a string sequence representing a west border. Notice that some surface strings, such as the corner surface strings [15] and [18], can be part of a string sequence representing either a west or an east border.

Figure 6B:
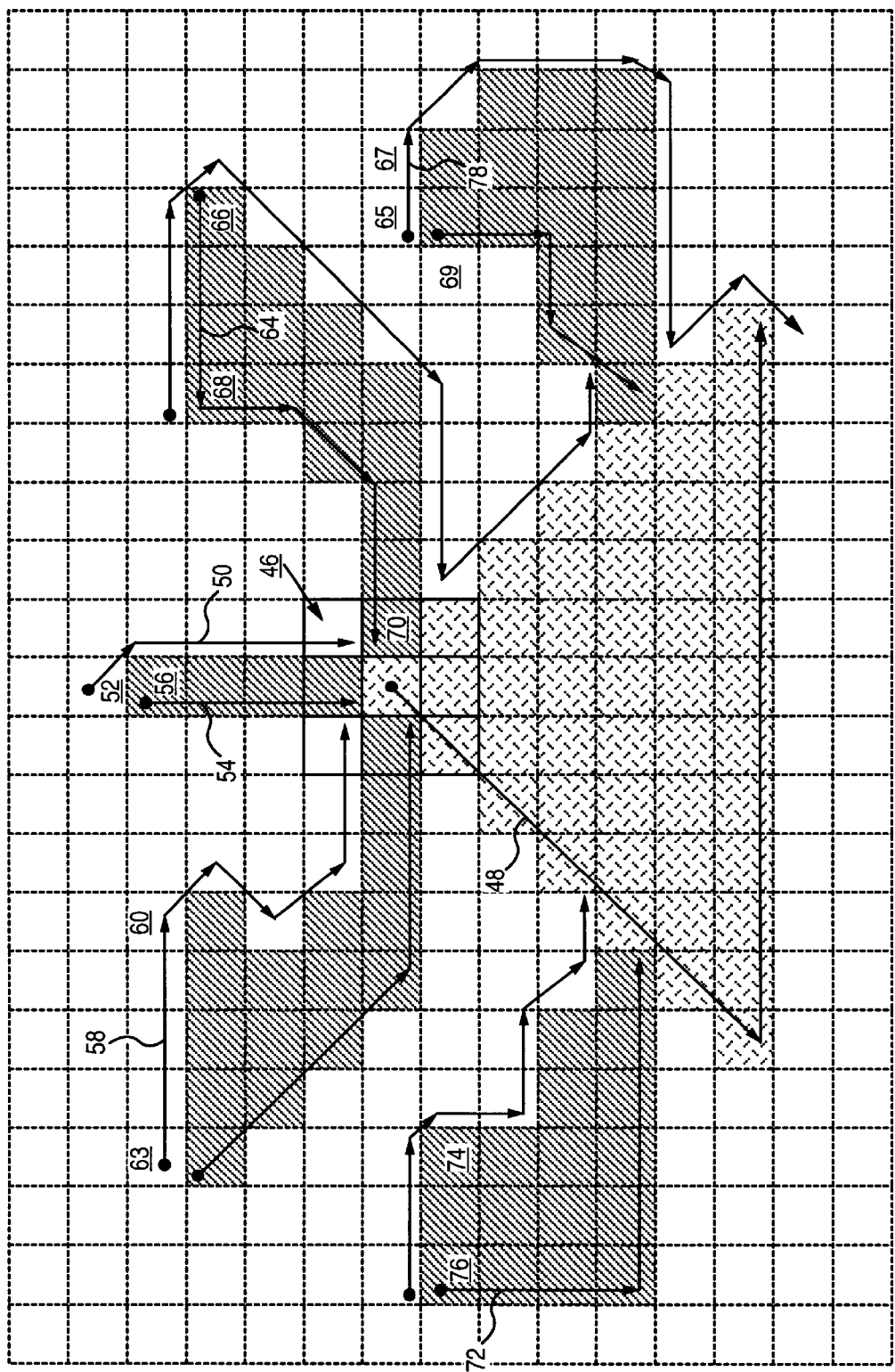
FIG. 6B shows a color raster image with more complex features and the corresponding border string sequences.

A better understanding of how the present invention uses the above priority rules to sequence strings is understood with reference to FIG. 6B which shows a raster image having more complex features and more colors than that of FIG. 6A. In FIG. 6B, only the border string sequences representing the west borders are shown; the border string sequences for the east borders in FIG. 6B are generated, but for clarity they are not shown. FIG. 6B also illustrates the situation where the neighborhood lookup table 36 of FIG. 3 will output multiple surface strings for a single neighborhood.

Consider, for example, the neighborhood 46 near the center of the image which has the following color pattern:

| Z | Z | Z |
|---|---|---|
| Z | Y | Z |
| Y | Y | Y |

Referring to the above neighborhood lookup table, this color pattern corresponds to entry:

| SURFACE STRINGS | ADR | $P_0$ | $P_0$ | $P_2$ | $P_3$ | T | $P_4$ | $P_5$ | $P_6$ | $P_7$ |
|---|---|---|---|---|---|---|---|---|---|---|
| 05, 02, 00, 00, 00, 00; | 7 | Z | Z | Z | Z | Y | Z | Y | Y | Y |

Thus, this entry outputs two surface string IDs [05] and [02]. The surface string [05] begins the border string sequence 48 for the west border of the pyramid, and the surface string [02] begins the border string sequence (not shown) for the eastborder of the pyramid.

The border string sequence 50 begins with surface string [46] at pixel 52 because it is the most northern pixel, and sequences to surface string [38] which is a corner surface string and thus ends the sequence. Similarly, border string sequence 54 begins with surface string [3] at pixel 56 because it is the most northern pixel, and sequences to surface string [36] which, when combined with surface string [30], forms special surface string [51] which is a corner surface string and thus ends the sequence.

Border string sequence 58 of FIG. 6B begins with surface string [13] at pixel 63 and sequences west to east as shown. The reason string sequence 58 begins with step surface string [13] at pixel 63 is because it has priority over the step surface string [17] at pixel 60 (pixel 63 is more western). The border string sequence 64 starting at pixel 66 begins with surface string [41] because it is a protruding corner surface string which has priority over the corner surface string [15] at pixel 68. Thus, border string sequence 64 sequences from east to west as shown and ends at protruding corner surface string [10] at pixel 70.

Border string sequence 72 begins with corner surface string [15] at pixel 76 because it has priority over corner surface string [18] at pixel 74 (i.e., it is the more western corner surface string). Similarly, border string sequence 78 starts with surface string [13] at pixel 65 because together with surface string [25] at pixel 69 it forms a special case corner surface string [54] which has priority over step surface string [17] at pixel 67. It should be apparent how the remainder of the border string sequences in FIG. 6B are generated using the priorities rules listed in the table above.

Contrast Tie Breaker

Figure 7A:
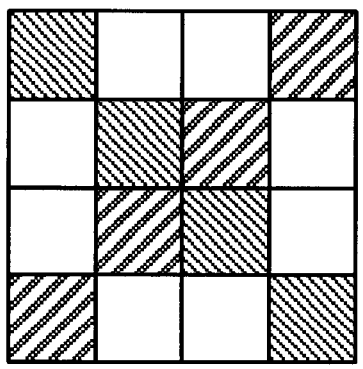
FIGS. 7A–7C illustrate a contrast conflict (contrast tie) in a raster image and how it is resolved.
Figure 7B:
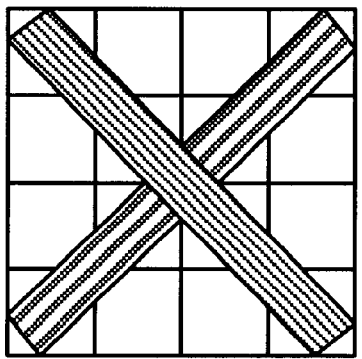
Figure 7C:
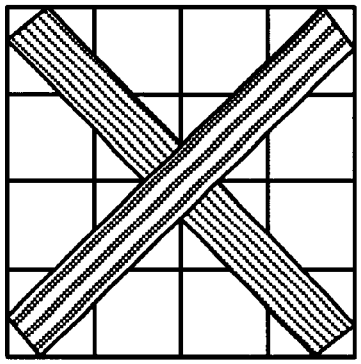

A necessary step in vectorizing a color image is to identify and resolve contrast ties in the image features. A contrast tie occurs when two features overlap such that one feature should appear in the background and the other in the foreground. This phenomenon is illustrated in FIG. 7A which shows a bit map of a raster image with two overlapping diagonal lines. The two possible representations of the diagonal lines in vector format are shown in FIGS. 7B and 7C; however, a human's perception of FIG. 7A will favor the representation shown in FIG. 7C over FIG. 7B. If the contrast ties are not resolved "correctly", the image will appear distorted when reconstructed from the vector data.

The contrast breaker 3 of FIG. 2 comprises two components: a contrast tie detector (CTD) for detecting the occurrence of a contrast tie in the raster data, and a contrast tie breaker (CTB) for breaking the contrast ties in a manner that parallels human perception. The general idea is to identify the presence of a contrast tie, and then to resolve or break the tie by changing the color value of a perimeter pixel relative to the target pixel in order to interrupt the string sequence of a recessive image feature, thereby allowing a dominant image feature to appear in the foreground.

Figure 8A:
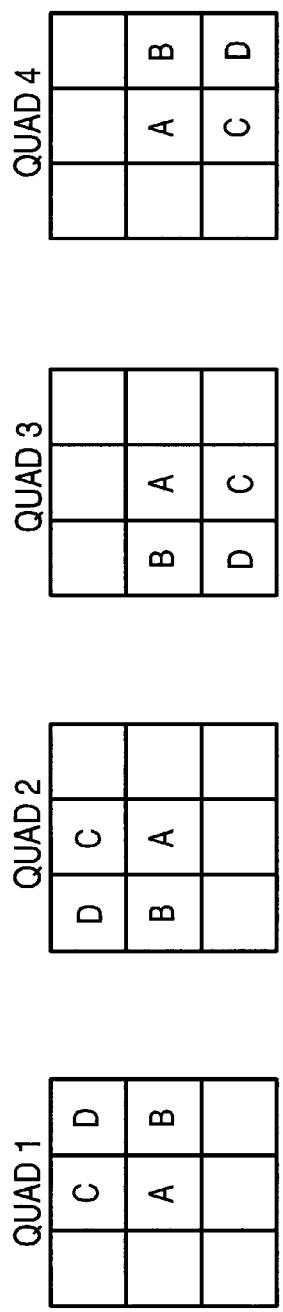
FIG. 8A shows the four quadrants in a 3×3 array of pixels that are processed to detect a contrast tie.

In order to reduce the number of comparison permutations, both the CTD and the CTB operate on quadrant subsections of a 3×3 array of pixels as shown in FIG. 8A. In the preferred embodiment, the contrast tie breaker 3 operates concurrently with the neighborhood scanner 28 described above with reference to FIG. 3. For each 3×3 array of pixels processed, the CTD performs a set of comparisons on the pixel data in the four quadrant subsections shown in FIG. 8A. A contrast tie is detected when the color of the A pixel equals the color of the D pixel (A==D), the color of the B pixel equals the color of the C pixel (B==C), and the color of the A pixel does not equal the color of the B pixel (A!=B). The raster bit map shown in FIG. 7A demonstrates when a contrast tie is detected in each of the four quadrants of the 3×3 array of pixels, as is further illustrated in FIGS. 8A–8D.

Figure 8B:
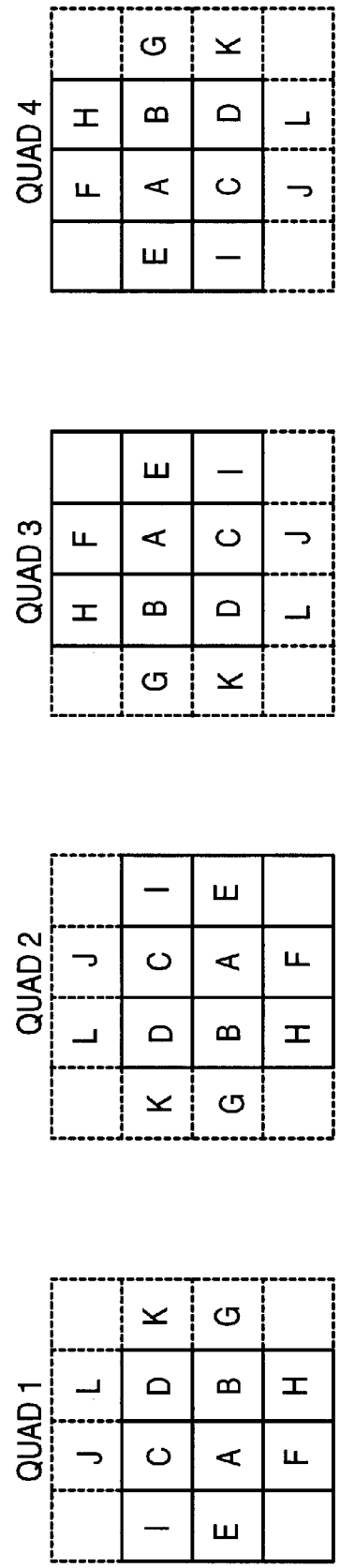
FIG. 8B shows the four quadrants in a 3×3 array of pixels and surrounding pixels that are processed to break a contrast tie.

In order to break a contrast tie, the CTB performs several progressive tests over the pixel data. These tests are performed over additional pixels surrounding the 3×3 array of pixels as illustrated in FIG. 8B. The first test, referred to as the contrast test, performs the following comparisons on the colors of the pixels contras 1=(A!=E)+(A!=F)+(D!=K)+(D!=L), contrast2=(B!=G)+(B!=H)+(C!=I)+(C!=J), A_loses=contrast1>contrast2.

If A_loses is true, then the color identifier for the D pixel is set to Z. That is, the color identifier of the D pixel is set different from the target pixel (the A pixel) so that the string sequence will terminate rather than sequence through the A and D pixels. This provides the desired effect of placing a recessive image feature in the background by breaking the feature into two string sequences as illustrated by the diagonal line sequencing from left to right in FIG. 7C. If A_loses is false, then the color identifier of the D pixel is left unchanged. This provides the desired effect of placing the dominate image feature in the foreground by allowing the string sequence to sequence through the A and D pixels as illustrated by the diagonal line sequencing from right to left in FIG. 7C. If A_loses is neither true nor false (i.e., if contrast1==contrast2), then the contrast test is indeterminate and the CTB performs a further test, referred to as the "brightness" test, to break the contrast tie.

The brightness test compares the brightness of pixel A to that of pixel B. In the preferred embodiment, each pixel comprises a red value, a green value and a blue value (RGB), and a pixel's brightness is generated by summing the RGB values. With the function get_whiteness (x) returning the sum of RGB for pixel x, the brightness test performs the following comparison >    contrast1=get_whiteness(A),
>
>    contrast2=get_whiteness(B),
>
>    A_loses=contrast1<contrast2.

If A_loses is true, then the color identifier for the D pixel is set to Z, and if A_loses is false, then the color identifier for the D pixel is not modified. If the brightness of the A and D pixels are equal (contrast1==contrast2), then the CTB performs yet another test, referred to as the "boldness" test, to break the contrast tie.

The boldness test compares the boldness of pixel A to that of pixel B, where a pixel's boldness is defined as its largest RGB value. With the function get_boldness(x) returning the largest RGB value for pixel x, the boldness test performs the following comparison >    contrast1=get_boldness(A),
>
>    contrast2=get_boldness(B),
>
>    A_loses=contrast1<contrast2.

If A_loses is true, then the color identifier for the D pixel is set to Z, and if A_loses is false, then the color identifier for the D pixel is not modified. If the boldness of the A and D pixels are equal (contrast1==contrast2), then the CTB performs a second boldness test by comparing the second largest RGB values of the A and B pixels.

With the function get_2nd_boldness(x) returning the second largest RGB value for pixel x, the second boldness test performs the following comparisons >    contrast1=get_2nd_boldness(A),
>
>    contrast2=get_2nd_boldness(B),
>
>    A_loses=contrast1<contrast2.

If A_loses is true, then the color identifier for the D pixel is set to Z, and if A_loses is false, then the color identifier for the D pixel is not modified. If the second boldness of the A and D pixels is equal (contrast1==contrast2), then the contrast tie is not broken and the color identifier for the D pixel is left unmodified.

Figure 9A:
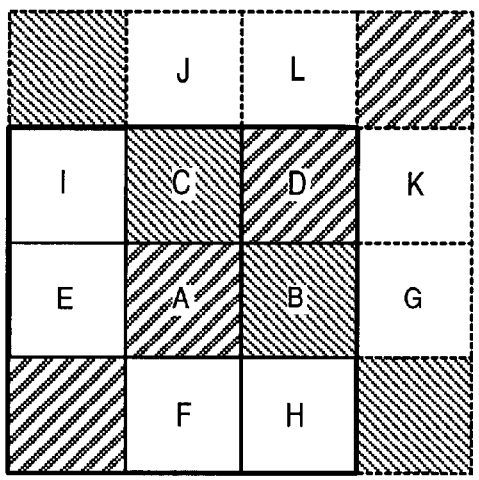
FIGS. 9A–9D illustrate the pixel bit maps evaluated to break a contrast tie in an example raster image.
Figure 9B:
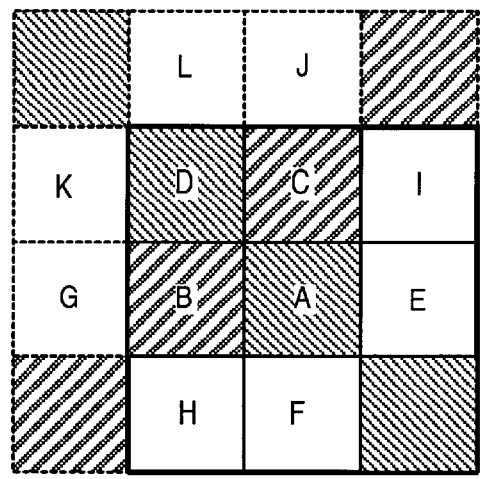
Figure 9C:
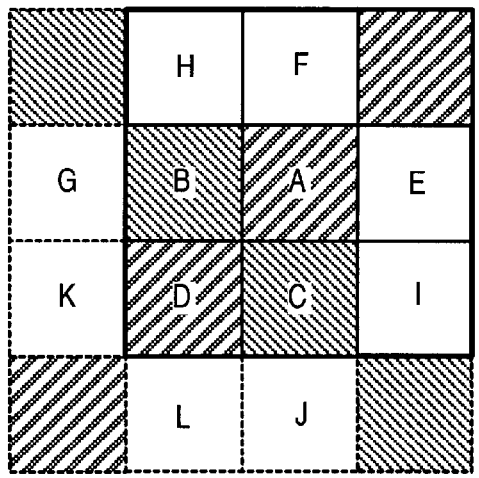
Figure 9D:
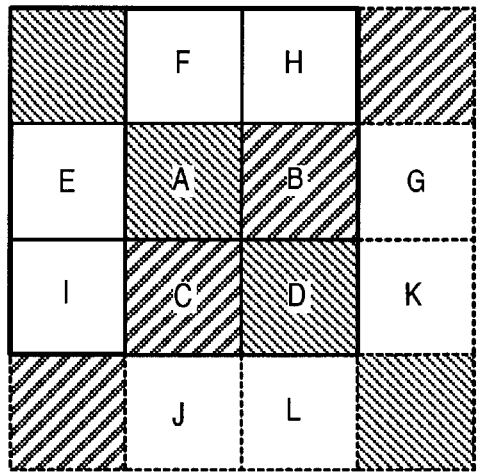

The above CTB tests are further understood with reference to FIGS. 9A–9D which correspond to the raster bit map of FIG. 7A. Referring to FIG. 9A, the CTD detects a contrast tie in quadrant one because the color of pixels A and D are equal, the color of pixels B and C are equal, and the color of pixel A is different from the color of pixel B. Turning to the tests performed by the CTB, the contrast test is indeterminate because contrast1==contrast2. The brightness test will indicate that pixel A is brighter than pixel B, therefore the color identifier for pixel D is not modified (it remains Y) so that the string sequence will sequence through the A and D pixels. Referring to FIG. 9B, the CTD will again detect a contrast tie in quadrant two and again the first test performed by the CTB, the contrast test, will be indeterminate because contrast1==contrast2. However, in this case the brightness test will indicate that pixel A is not brighter than pixel B so the color identifier for pixel D will be set to Z (i.e., different from pixel A). Consequently, the string sequence will terminate at pixel D and begin again at pixel A so that the diagonal line sequencing from left to right in FIG. 7C will appear in the background.

The above description of the contrast tie breaker was initially disclosed in the parent application Ser. No. 09/104,302 filed on Jun. 24, 1998. The above implementation will resolve a contrast tie correctly for a majority of cases encountered, however, the applicants have since discovered improvements to the contrast tie breaker that is capable of resolving contrast ties in additional, less frequent cases, and even cases which exceed human perception. This enhanced version basically expands the number of pixels evaluated with respect to the target pixel in a neighborhood of pixels.

First, the number of pixels evaluated in the above contrast test with respect to FIG. 8B is expanded to include the corner pixels M, N, O and P of the 4×4 quadrants as shown in FIG. 8C. The comparisons on the colors of the pixels then becomes >    contrast1=(A!=E)+(A!=F)+(A!=I)+(A!=O)+(A!=H)+(D!=K)+(D!=L)+(D!=J)+(D!=N)+(D!=G),
>
>    contrast2=(B!=G)+(B!=H)+(B!=K)+(B!=P)+(B!=F)+(C!=I)+(C!=J)+(C!=M)+(C!=L)+(C!=E),
>
>    A_loses=contrast1>contrast2.

As described above, if A_loses is true, then the color identifier for the D pixel is set to Z. That is, the color identifier of the D pixel is set different from the target pixel (the A pixel) so that the string sequence will terminate rather than sequence through the A and D pixels. If A_loses is false, then the color identifier of the D pixel is left unchanged. If A_loses is neither true nor false (i.e., if contrast1==contrast2), then the contrast test is indeterminate and the CTB performs an additional test, referred to as the "area contrast" test, before performing the above described brightness and boldness tests.

The area contrast test further expands the number of pixels evaluated by increasing the 4×4 array of pixels to a 5×5 array of pixels as shown in FIG. 8D. The color value of the pixels are then evaluated using the following comparisons >    contrast1=(A!=P)+(A!=M)+(A!=Q)+(A!=R)+(A!=S)+(A!=T)+(A!=U)+(A!=V)+(A!=W)+(A!=X)+(A!=Y),
>
>    contrast2=(B!=O)+(B!=N)+(B!=Q)+(B!=R)+(B!=S)+(B!=T)+(B!=U)+(B!=V)+(B!=W)+(B!=X)+(B!=Y)
>
>    A_loses=contrast1>contrast2.

Again, if A_loses is true, then the color identifier for the D pixel is set to Z. That is, the color identifier of the D pixel is set different from the target pixel (the A pixel) so that the string sequence will terminate rather than sequence through the A and D pixels. If A_loses is false, then the color identifier of the D pixel is left unchanged. If A_loses is neither true nor false (i.e., if contrast1==contrast2), then the contrast test is indeterminate and the CTB performs the additional brightness and boldness tests described above to break the contrast tie.

Data Tagger

The border string sequences 6 output by the border definer 4 are converted into tags 12 by the data tagger 8 of FIG. 2. The tags 12 represent markers for various shapes in the raster image; in particular, the tags 12 represent markers for non-axial line, axial line, and curve shapes. The tag representation of the raster image is essentially a mathematical representation and therefore a vector format. Unlike the prior art Bezier curve representation as described above, the tags of the present invention are not placed at random along the border of an image feature. Instead, the data tagger 8 evaluates the border string sequences 6 and identifies different shapes using a particular criteria. Once a shape is identified, the tags are generated and placed on the shape in a manner that optimizes the quality of the vector representation, as well as the quality of the image when converted back to raster for viewing.

Surfaces

To facilitate the identification of the different shapes in the raster image, the border string sequences 6 are conceptually viewed as comprising one or more surfaces. Each surface takes on a particular shape (non-axial line, axial line, or curve) and each surface is made up of one or more surface string sequences. The surface string sequences are in turn processed to generate the tags for a particular shape.

A non-axial line shape is a line that is not parallel to an axis (X or Y). An axial line shape is a line that is parallel to an axis (X or Y). A curve shape is the default shape meaning that it is neither a non-axial line nor an axial line. As described below, specific rules are employed to identify the specific shapes that a border string sequence comprises.

A border string sequence begins with a new surface which may span the entire border, or it may terminate with the beginning of a new surface. A current surface will end and a new surface will begin in one of two ways: an estrangement or a non-axial line beginning or ending.

Figure 11A:
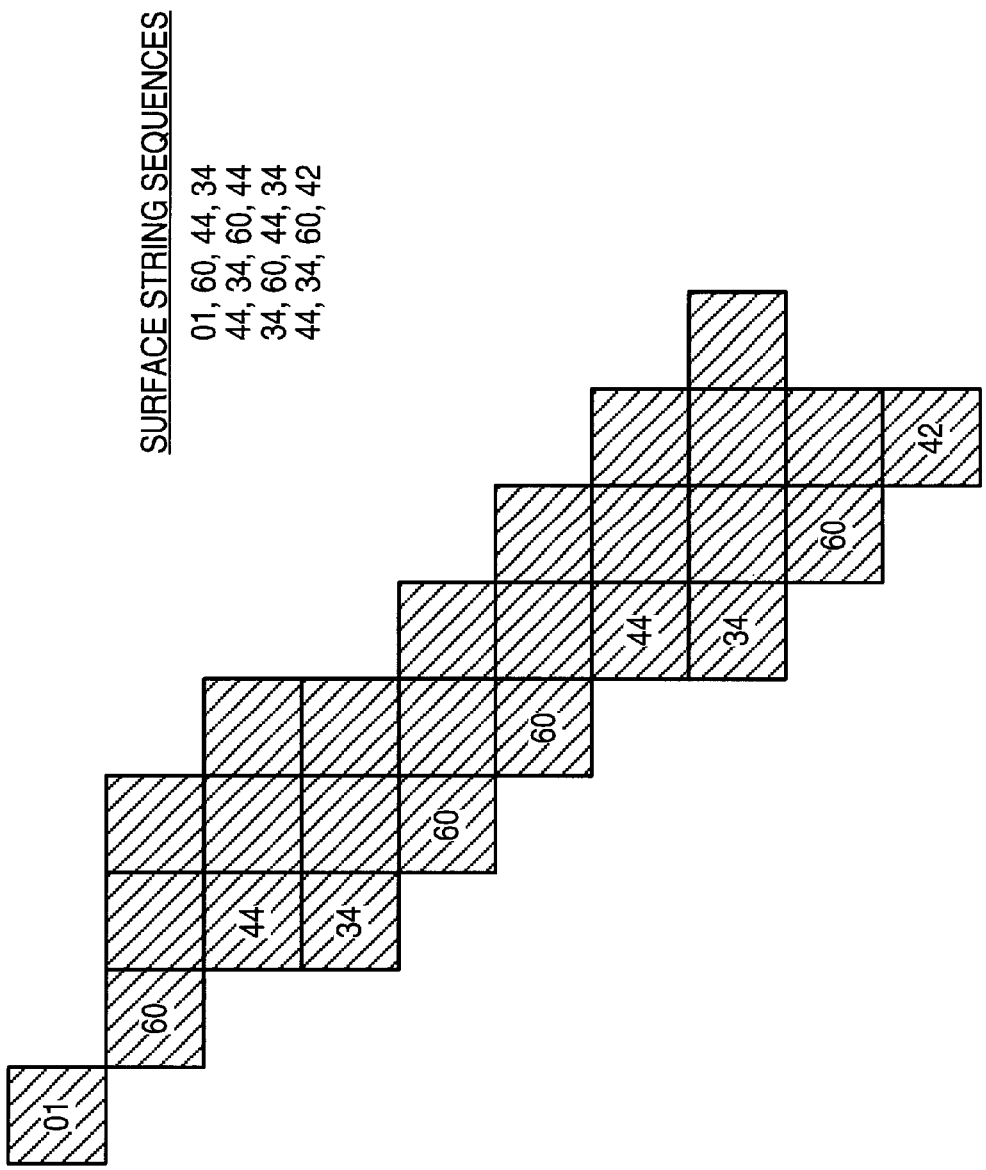
FIG. 11A illustrates a border string sequence for an image feature comprising a single surface and the corresponding surface string sequences.
Figure 11C:
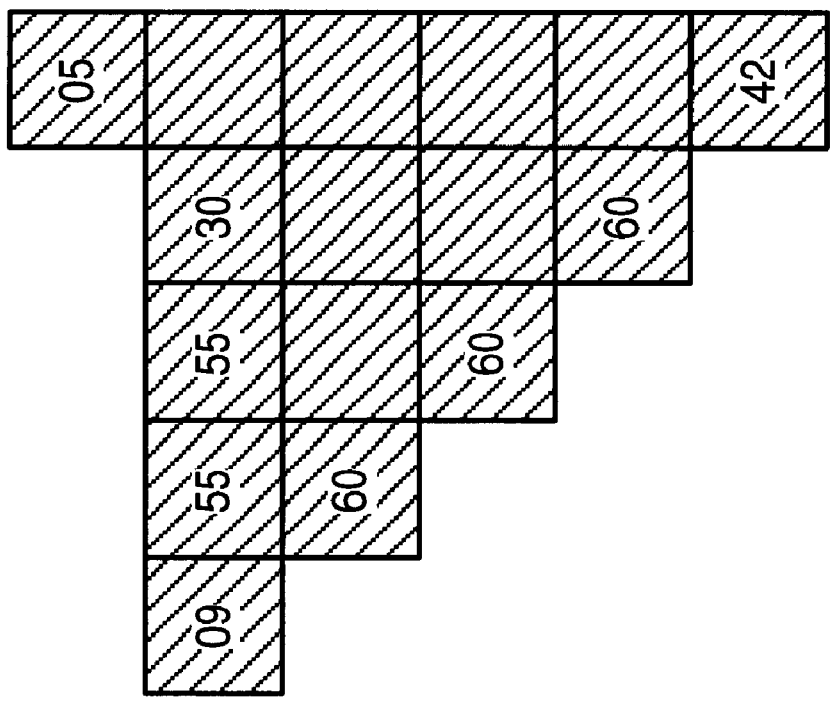
FIG. 11C illustrates a border string sequence comprising two surfaces delineated by a ninety degree estrangement.
Figure 11D:
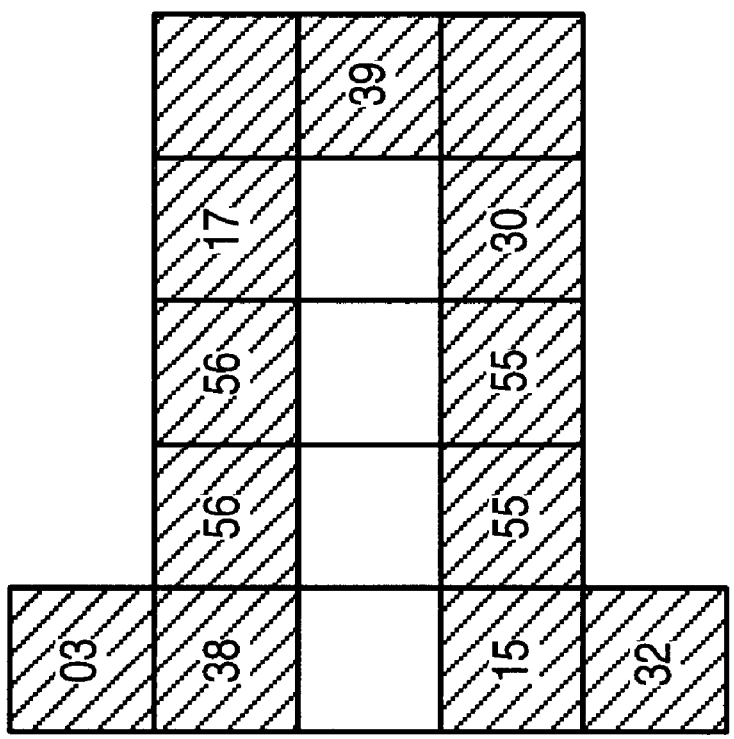
FIG. 11D illustrates an estrangement in an image formed by a single wrap row occurring when three surface strings wrap around another surface string.

An estrangement occurs when the receive and send slope of a surface string in the border string sequence form an angle less than ninety degrees as illustrated in FIG. 11C, or when a single wrap row occurs in the image. A single wrap row occurs whenever three surface strings wrap around another surface string which occurs, for example, when there is a protruding line in the image such that the surface strings wrap around the protruding line as illustrated in FIG. 11D. There are specific rules for when a non-axial line will begin or end as set out in the examples described below with reference to FIGS. 12–17.

Figure 10:
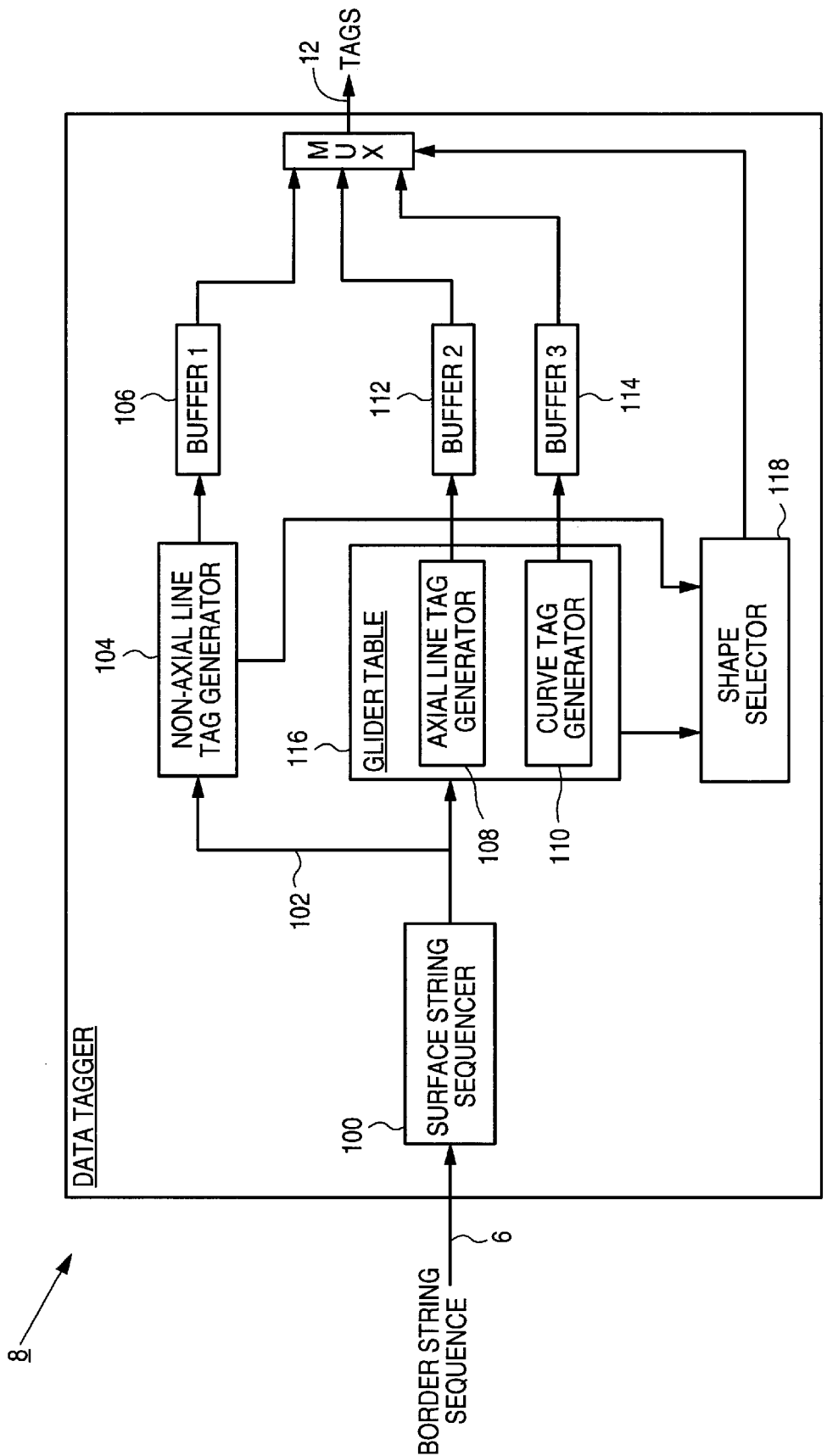
FIG. 10 shows further details of the data tagger of FIG. 2 which converts a border string sequence into surfaces comprising surface string sequences which are ultimately converted into a set of tags.

Referring now to FIG. 11A, shown is an image feature represented by a border string sequence comprising a single surface since there are no single wrap rows, estrangements, or non-axial lines beginning or ending. The surface is represented as a curve shape since the surface does not meet the criteria for a non-axial or axial line. The surface string sequences for this particular surface, as generated by the surface string sequencer 100 of FIG. 10, are:

Surface String Sequences 01,60,44,34

44,34,60,44

34,60,44,34

44,34,60,42

A surface string sequence comprises up to three non-repeating surface strings and up to two repeating surface strings. A non-repeating string is a surface string wherein the receive and send slopes are not equal. A repeating surface string is a surface string wherein the receive and send slopes are equal; only one repeating string is saved in the surface string sequence together with the number of repeating strings. With the letter "N" representing a non-repeating surface string, and the letter "R" representing a repeatable surface string, the possible surface string sequence combinations are:

NN

NRN

NNN

NNRN

NRNN

NRNRN

The surface strings in a surface string sequence overlap to maximize the visibility when identifying the surface shapes and generating the tags. Referring to FIG. 11A for example, the second surface string sequence starts with the second to last non-repeating surface string of the first surface string sequence, the third surface string sequence starts with the second to last non-repeating surface string of the second surface string sequence, and so on.

The visibility of surface string sequences is also enhanced by including surface strings from a related surface. Surfaces are related if they are joined by an angle of ninety degrees or more, which occurs when the adjacent surface strings comprise receive and send slopes which form an angle of ninety degrees or more. This is illustrated in FIG. 11B which shows the border string sequences for the east and west borders of a black feature in an image. The border string sequences shown in FIG. 11B each comprise a single surface. The end of the west border string sequence {10,56, 17,29,56,33} and corresponding surface is related to the end of the east border string sequence {18,13} and corresponding surface because the surface string {33} has a receive and send slope which form an angle of ninety degrees. Similarly, the end of the west border string sequence {18,55,12,30} and corresponding surface is related to the end of the east border string sequence {10,55,16,11,55,30} and corresponding surface because the surface strings {30} has a receive and send slope which form an angle of more than ninety degrees. Thus, both of the west border surfaces comprise a surface string sequence which overlaps into the related surface. For example, the surface corresponding to the west border string sequence {10,56,17,29,56,33} comprises the following surface string sequences:

Surface String Sequences 10,56,17,29

17,29,56,33

18,33,56,29

Notice that the last string sequence comprises the second to last non-repeating surface string 18 from the related surface of the east border string sequence {18,33}. Also notice that the beginning of the above surface string sequence does not include any surface strings from the surface corresponding to the east border string sequence {10,55,16,11,55,30} because the surfaces are estranged (the surface string {10} has a receive and send slope of zero which is less than ninety degrees).

Figure 1A:
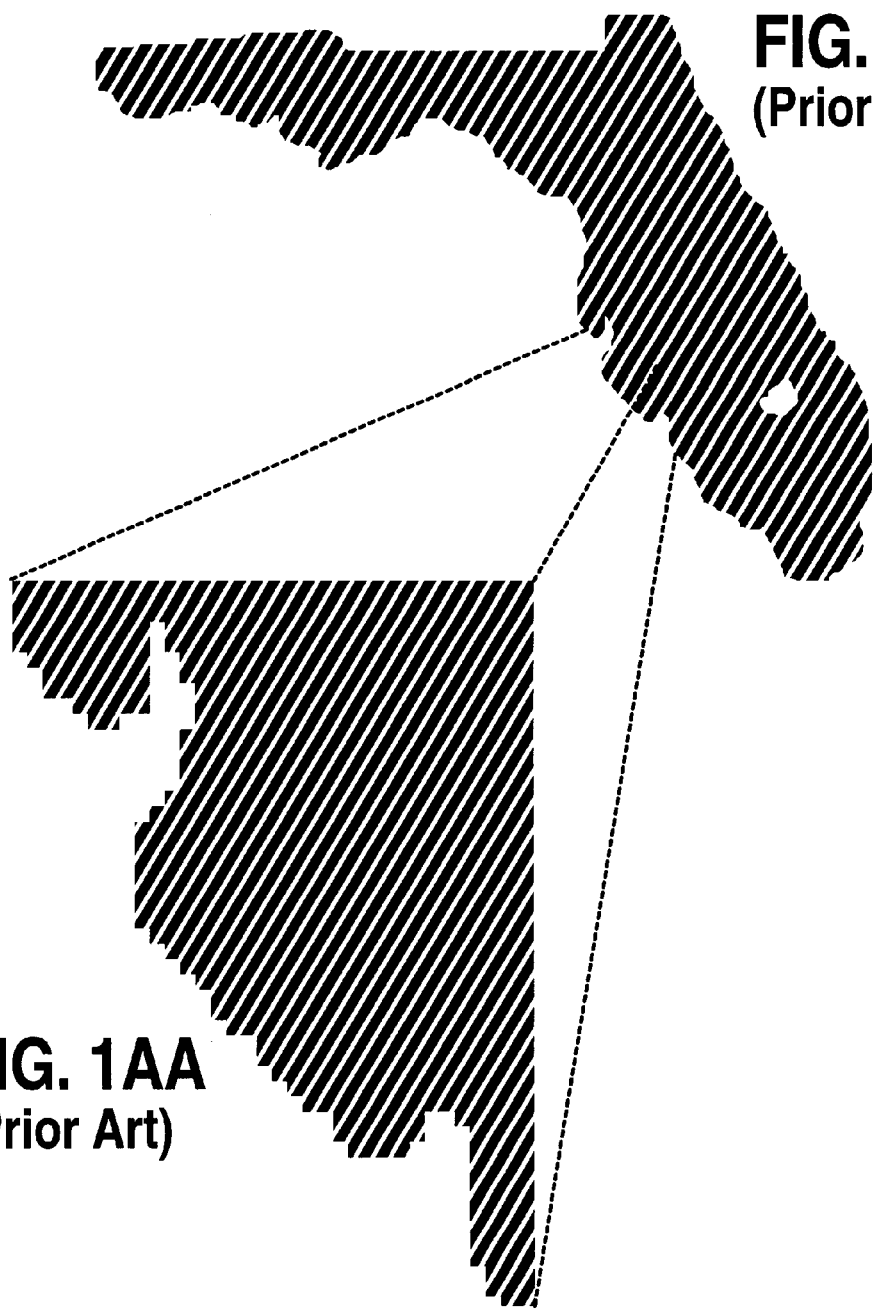
FIGS. 1A and 1AA illustrates the granular distortion that occurs when magnifying a raster image.
Figure 1B:
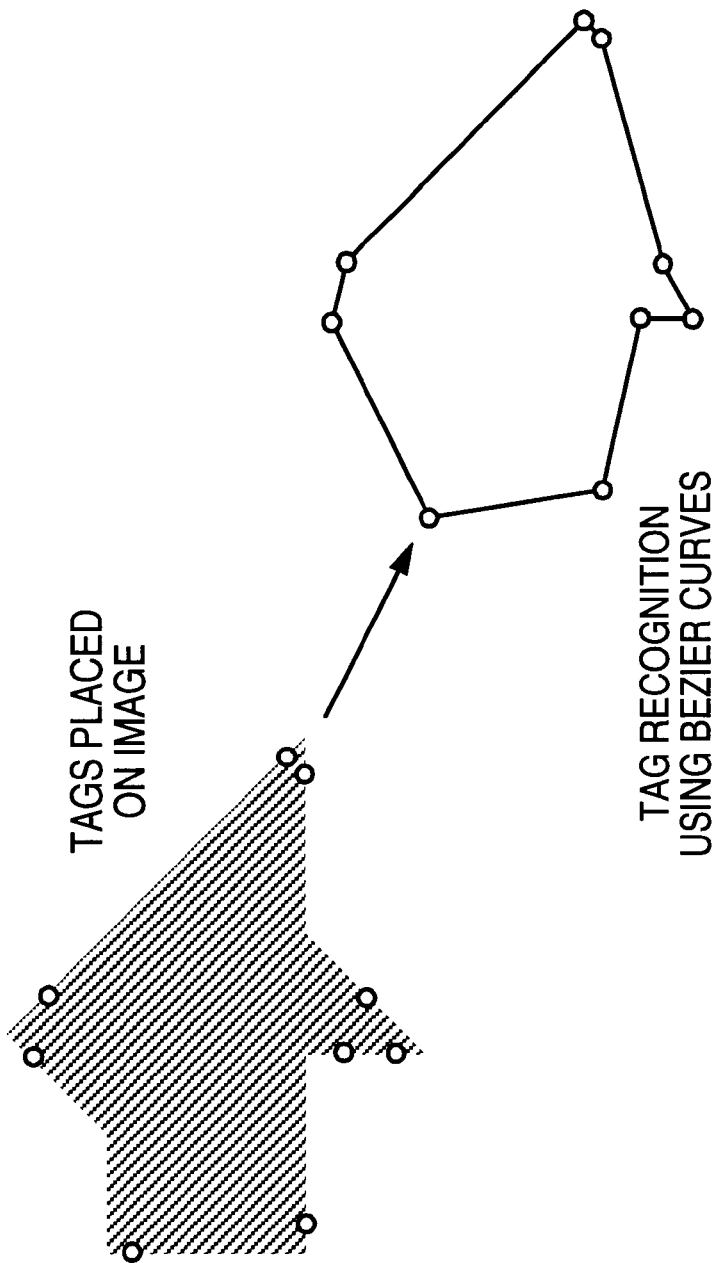
FIG. 1B illustrates a prior art Bezier curve technique for converting raster images into vectors.

Referring now to FIG. 1C, shown is an example border string sequence comprising two surfaces that are estranged. The border string sequence {05,30,55,09,60,42} comprises a first surface with surface string sequence {05,30,55,09} and a second surface with surface string sequence {09,60, 42}. The surfaces are estranged at surface string {09} which has a receive and send slope which form an angle of less than ninety degrees. Because the surfaces are estranged, the surface string sequences do not overlap.

An example where a single wrap row breaks a surface into two surfaces is illustrated in FIG. 11D which shows a black line wrapping around a protruding white line. The border string sequence for the west black border is {03,38,56,56, 17,39,30,55,55,15,32} which comprises two surfaces delineated by surface string 39 (i.e., surface string 39 creates an estrangement). The surface string sequences for the first surface are {03,38,56,17} and {38,56,17,39}, wherein the latter surface string sequence includes the second to the beginning non-repeating surface string 39 from the second surface since the surfaces are related. Similarly, the surface string sequences for the second surface are {17,39,30}, {39,30,55,15} and {30,55,15,32}, wherein the former surface string sequence includes the second to the last non-repeating surface string 17 from the first surface since the surfaces are related. Both surfaces would be designated as axial line shapes with axial line tags placed thereon.

Line Curve Determination

Referring again to FIG. 10, after the border string sequences have been broken into surfaces, the surface string sequences 102 generated by the surface string sequencer 100 are evaluated to determine the shape of each surface (line or curve). A set of tags is generated for each possible shape (non-axial line, axial line and curve) as a surface string sequence 102 is being processed. The surface shape is determined based on a particular set of rules; once the surface shape has been determined, the corresponding set of tags is selected by the shape selector 118 as the output 12 of the data tagger 8.

A non-axial line tag generator 104 generates non-axial line tags for a current surface string sequence 102; these tags are accumulated in BUFFER_1 106. An axial line tag generator 108 and a curve tag generator 110 concurrently generate line and curve tags which are stored in BUFFER_2 112 and BUFFER_3 114, respectively. The axial line tag and curve tag generators are implemented using a lookup table referred to as a glider table 116, and the non-axial line tag generator 104 implements a specific set of rules (in hardware or software) to generate the non-axial line tags.

In addition to generating the tags, the tag generators determine whether the current surface string sequence 102 conforms to the respective shape. There is a particular priority in selecting the surface shape where non-axial line shapes have the highest priority, then the axial line shape, and finally the curve shape (the default shape). In other words, the non-axial line tags are selected if the current surface conforms to the rules which define a non-axial line as described below. If the current surface cannot be a non-axial line, then the axial line tags are selected if the surface fits the criteria for an axial line. Otherwise, the surface is deemed to be a curve shape and the curve tags are selected for the surface.

The shape selector 118 in the data tagger 8 selects the appropriate tag set from one of the tag buffers 106, 112 or 114 based on information supplied by the tag generators. As described in greater detail below, it is possible for the glider table 116 to indicate that the current surface is either an axial line or a curve shape. For example, if the data tagger 8 reaches the end of the current surface and a decision as to the surface shape has not been made, or if the buffers 112 or 114 overflow and a decision as to the surface shape has not been made, then the shape selector 118 will use information provided by the glider table 116 as well as information from adjacent surfaces to determine the shape for the current surface.

When the current surface does not meet the criteria for a non-axial line shape, the current surface meets the criteria for both an axial line shape and a curve shape, and the current surface is the first or last surface of a current border, then the shape selector selects the data tags for the current surface based on a shape assigned to an adjacent surface of an adjacent border. When the current surface does not meet the criteria for a non-axial line shape, the current surface meets the criteria for both an axial line shape and a curve shape, and the current surface is not the first or last surface of a current border, then the shape selector selects the data tags for the current surface based on a shape assigned to an adjacent surface within the border comprising the current surface.

Non-Axial Line Formation

Figure 12:
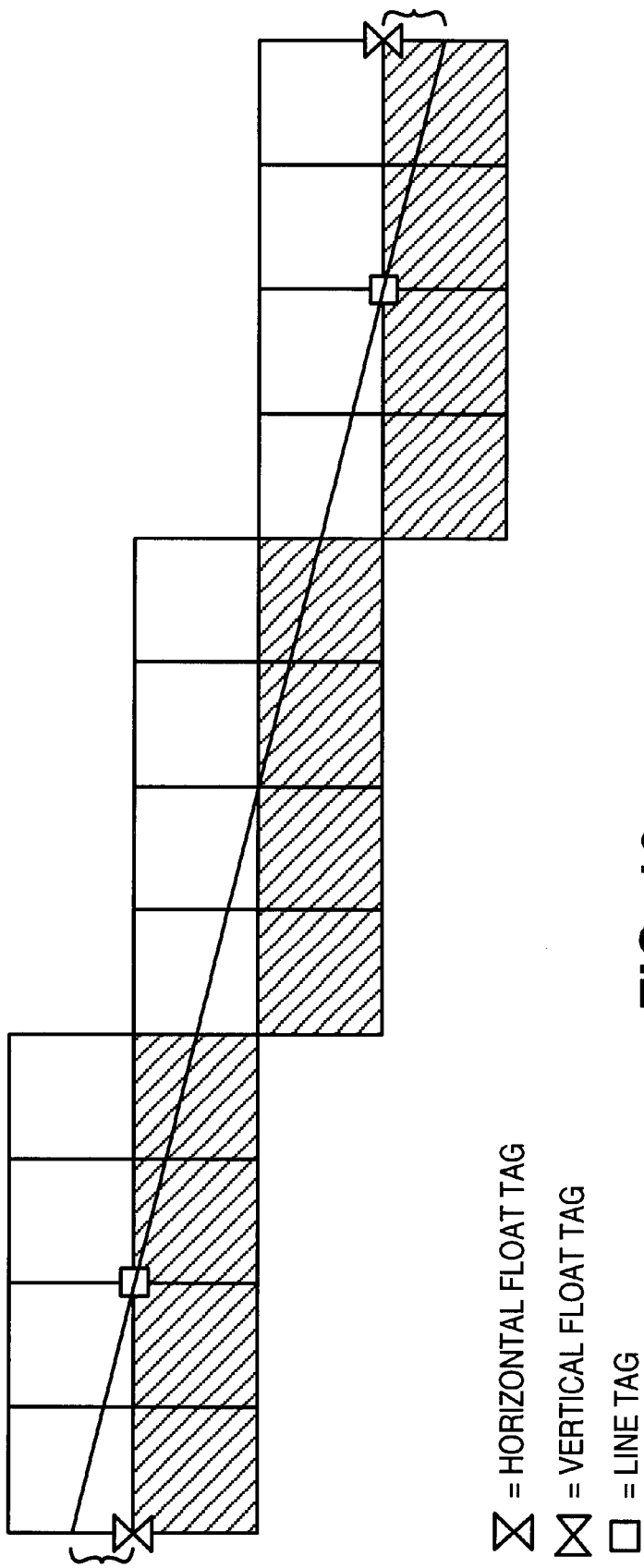
FIG. 12 illustrates a non-axial line shape in a raster image which is converted into a pair of float tags representing the beginning and end of the line, and a pair of line tags representing the slope of the line.

A non-axial line can occur where the pixels of a raster image form two or more contiguous plateaus, and certain other criteria are satisfied. An example non-axial line comprising three plateaus is shown in FIG. 12. A non-axial line is defined by two float tags representing the ends of the line, and two line tags representing the slope of the line. The term "float" refers to floating point arithmetic and in the context of "float tag" it denotes non-floating point (i.e., integer) arithmetic which reduces the cost and complexity of the present invention. The float tags are placed on the end pixels of a defining surface of the end plateaus. For the non-axial line surface shown in FIG. 12, the defining surface is along the western border of the white plateaus. There are two types of float tags, horizontal and vertical, which are used to define the predominantly horizontal and the predominantly vertical non-axial lines, respectively. Horizontal float tags can move vertically but not horizontally, and vertical float tags can move horizontally but not vertically. The movement can be up to one pixel length. This is illustrated in FIG. 12 wherein the horizontal float tags are displaced from the ends of the lines by one-half a pixel. Before describing the placement of the line tags along the non-axial line surface, the criteria for defining when a non-axial line can occur in a raster image will now be described.

A non-axial line can begin at the beginning of a surface (e.g., at the beginning of a border), or it can begin when the receive and send slope of a surface string in the border string sequence forms an angle of ninety degrees or less. If either of these conditions are satisfied, then one of the following conditions must also be satisfied for the current surface to satisfy the requirements for a non-axial line:

1. there are at least three contiguous plateaus;
2. there are two contiguous plateaus which together exceed a predetermined length;
3. there are two contiguous plateaus wherein the adjacent surfaces are either non-axial or axial line shapes;
4. there are two contiguous plateaus which together form a dominant length; or
5. there are two contiguous plateaus which do not exceed the predetermined length but which have a related surface Examples of when a non-axial line forms in a raster image are illustrated in the figures.

Figure 13B:
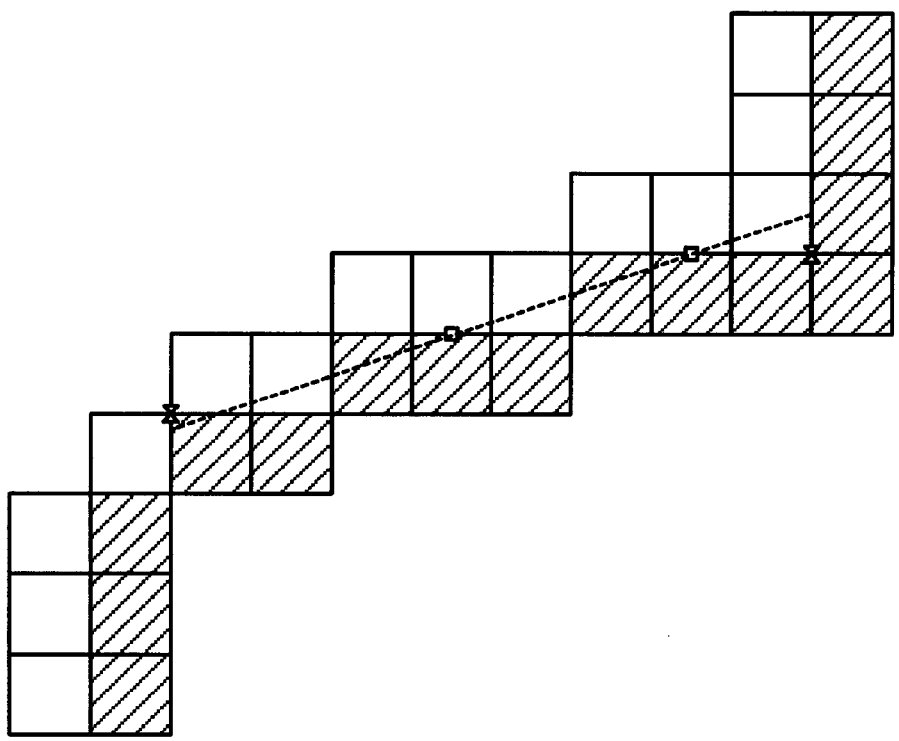
FIG. 13B illustrates three contiguous plateaus which do not form a non-axial line shape in the absence of a ninety degree or less estrangement at the beginning (or end) of the line.
Figure 13A:
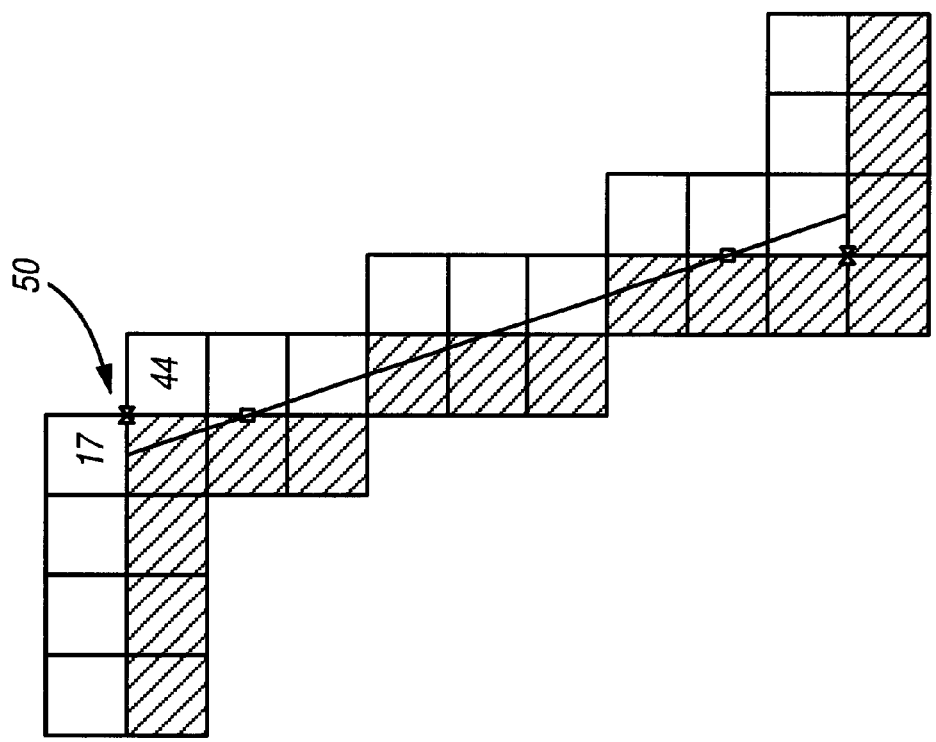
FIG. 13A illustrates the formation of a non-axial line shape due to three or more contiguous plateaus estranged by ninety degrees or less at the beginning and end of the line.

FIG. 13A illustrates a non-axial line forming when three contiguous plateaus are separated on both ends by corner surface strings. Surface strings 17 and 44 form the special case surface string 50 which is a corner surface string. A non-axial line would also form when three contiguous plateaus are at the beginning of a border. FIG. 13B illustrates three contiguous plateaus which do not form a non-axial line because they do not begin with a surface string comprising a receive and send slope of ninety degrees or less.

Figure 14B:
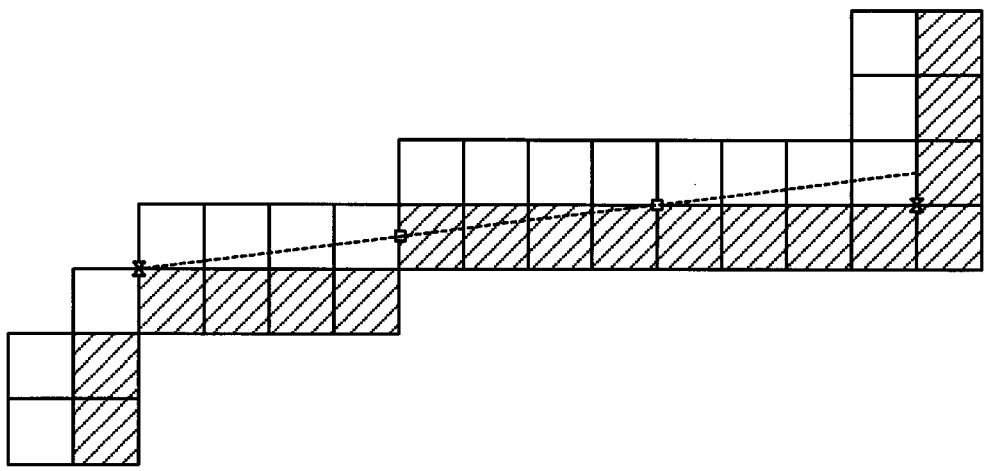
FIG. 14B illustrates two contiguous plateaus having a length which exceeds the predetermined number of pixels, but which do not form a non-axial line shape in the absence of a ninety degree or less estrangement at the beginning (or end) of the line.
Figure 14A:
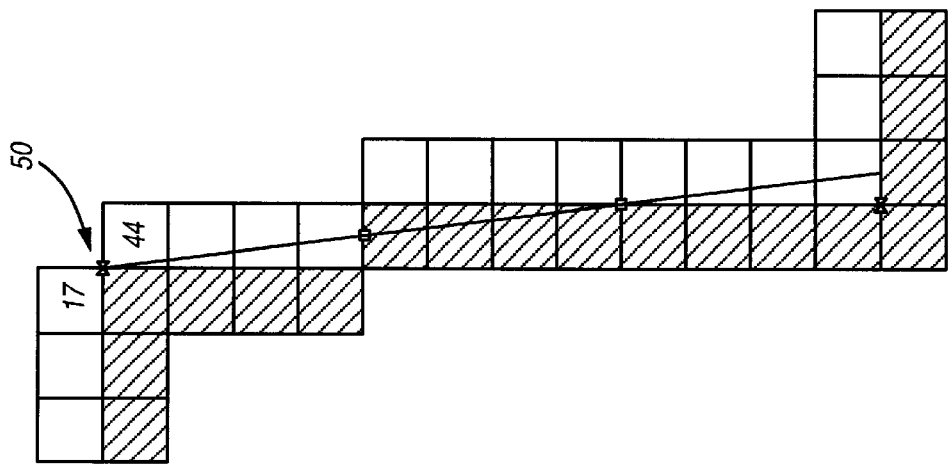
FIG. 14A illustrates the formation of a non-axial line shape due to two contiguous plateaus estranged by ninety degrees or less at the beginning and end of the line and having a length which exceeds a predetermined number of pixels

FIG. 14A illustrates a non-axial line forming when two contiguous plateaus are separated on both ends by corner surface strings and which together exceed a predetermined length (in this case eleven pixels). The predetermined length is dependent on the pixel resolution of the raster image, wherein the length would increase as the resolution increases. A non-axial line would also form when two contiguous plateaus exceed the predetermined length at the beginning of a border. FIG. 14B illustrates two contiguous plateaus of sufficient length but which do not form a non-axial line because they do not begin with a surface string comprising a receive and send slope of ninety degrees or less.

Figure 15B:
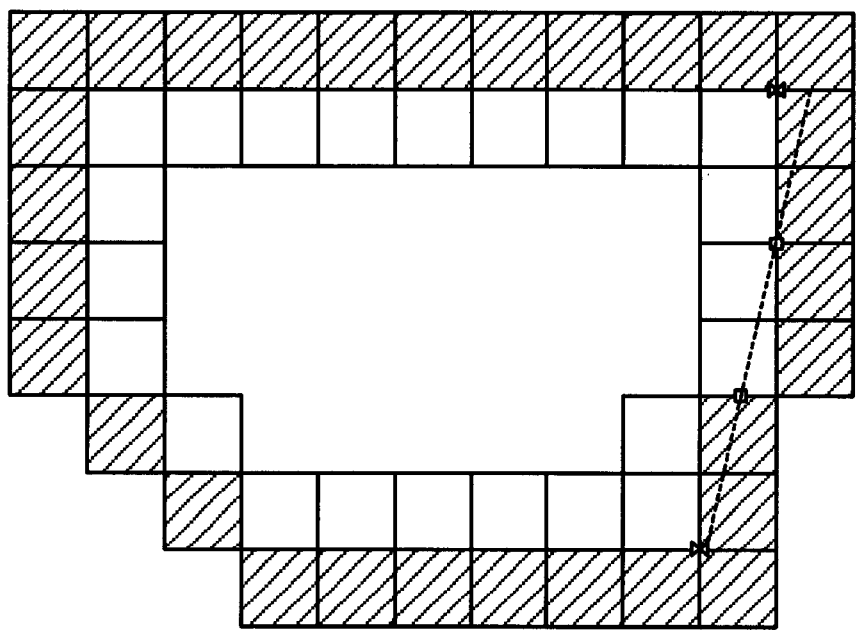
FIG. 15B illustrates two contiguous plateaus which do not form a non-axial line shape because the related surfaces are not axial or non-axial line shapes.
Figure 15A:
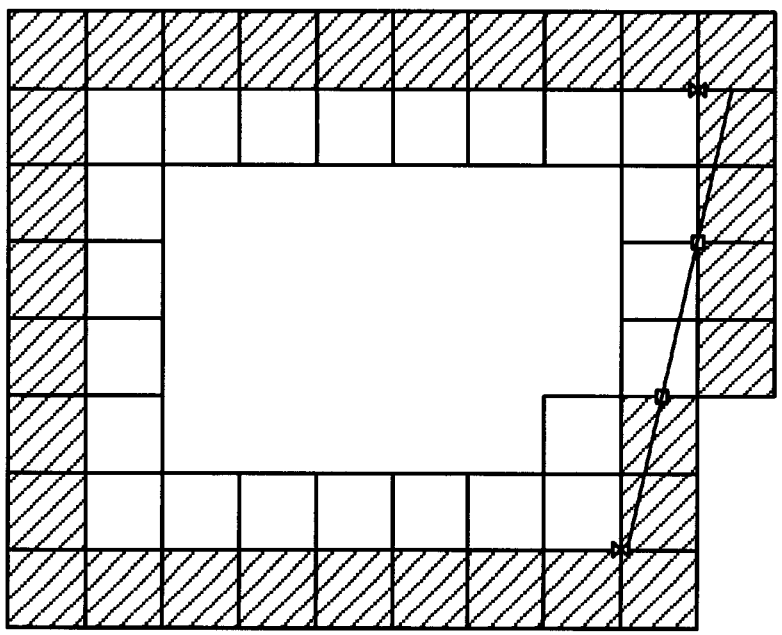
FIG. 15A illustrates two contiguous plateaus which form a non-axial line shape due to being estranged by ninety degree or less at the beginning and end of the line and because the related surfaces are axial or non-axial line shapes.

FIG. 15A illustrates a non-axial line forming when two contiguous plateaus are separated on both ends by corner surface strings and the related surfaces (at the beginning and end) are axial lines. FIG. 15B illustrates two contiguous plateaus which do not form a non-axial line even though separated on both ends by corner surface strings because they are not of sufficient length and because the related surface at the beginning is a curve surface.

Figure 16B:
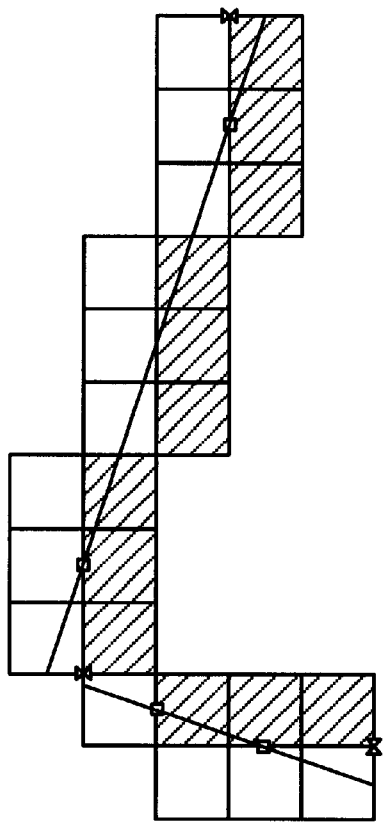
FIG. 16B illustrates two contiguous plateaus which form a non-axial line shape because the related surface is either an axial or non-axial line shape.
Figure 16A:
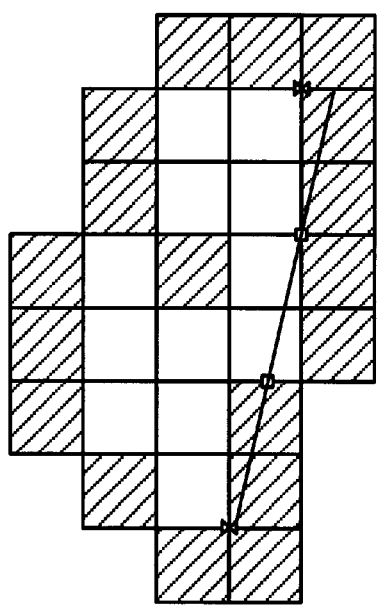
FIG. 16A illustrates two contiguous plateaus which form a non-axial line shape due to being estranged by ninety degree or less at the beginning and end of the line and because the associated surface is a dominant surface (the longest surface when compared to the related surfaces).

FIG. 16A illustrates a non-axial line forming when two contiguous plateaus are separated on both ends by corner surface strings even though the related surface string at the beginning is a curve surface. The reason the two contiguous plateaus of FIG. 16A form a non-axial line is because they form a dominant length surface meaning it is the longest surface with respect to the related surfaces.

FIG. 16B illustrates two non-axial lines forming at the beginning of a border. One non-axial line forms from three contiguous plateaus occurring at the beginning of a border, and the other non-axial line forms from two contiguous plateaus being related to the first non-axial line at the beginning of a border.

A non-axial line will continue through a single surface in a border string sequence as long as the plateaus satisfy a particular length criteria. The criteria requires that middle plateaus be as long or one pixel length shorter than the longest length plateau. Thus, a non-axial line will extend through a surface when the pixels in the raster image form more than two contiguous plateaus, the contiguous plateaus comprise a beginning plateau, an ending plateau, and at least one middle plateau, the contiguous plateaus comprise at least one longest length plateau, and the at least one middle plateau comprises a number of pixels equal to or one less than the number of pixels in the longest length plateau.

Figure 17:
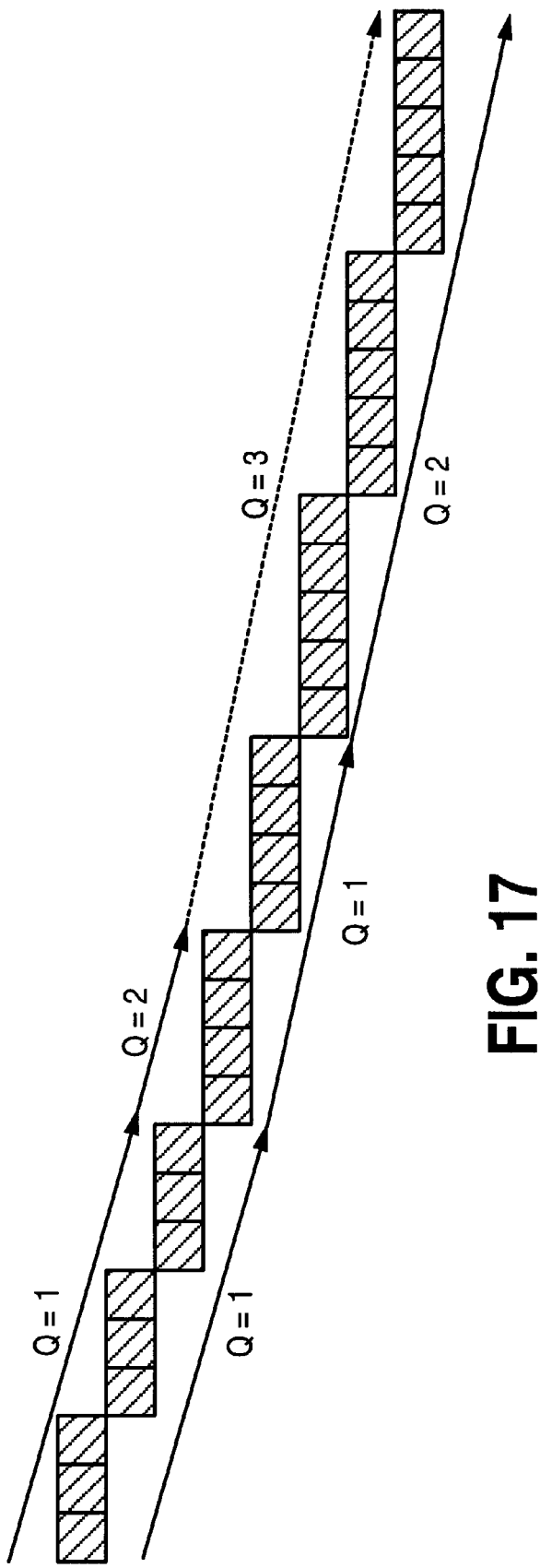
FIG. 17 illustrates the formation of a dual non-axial line shape comprising two non-axial line shapes that do not individually span a surface, but when concatenated span the surface.

The length criteria of the middle plateaus is illustrated in FIG. 17. The following definitions aid in understanding the length constraints of the middle plateaus:

a. Plateau Lengths:
  Long (L): The longest length plateau (five in FIG. 17).
  Moderate (M): A moderate length plateau is one pixel length shorter than a long plateau (four in FIG. 17).
  Short (S): A plateau that is too short to be a moderate length.
b. Short Ends: Extreme plateaus (at beginning or end of a non-axial line) and can be of any length.
c. Malor Length (J): The most common length between Ms and Ls where short ends are not counted. If there are the same number of Ms and Ls, the Ms become the Js.
d. Minor Length (N): When both Ms and Ls are present, the minor length is the least common length between the Ms and Ls where short ends are not counted. If there are two or more minority length plateaus in a row, not counting short ends, then the non-axial line terminates (i.e., the current surface cannot be a non-axial line).
e. Line Quality (Q): Indicates how close the current surface is to a line. If there are no Ns, the Q is one. If there are Ns, the Q is two. If the surface is a curve, the Q is three.

The non-axial line tag generator 104 of FIG. 10 updates the line quality (Q) as it processes the surface string sequences 102 for a current surface. Referring again to FIG. 17, the first three plateaus at the beginning of the border (and first surface) potentially form the beginning of a non-axial line. The Q is initially one since there are no Ns. When the fourth plateau is processed, the Q changes to two since the fourth plateau is one pixel length longer than the first three plateaus. The majority length (J) plateau is-three pixels long, and the minority length (N) plateau is four pixels long. The surface is still a non-axial line because the constraint on the length of the middle plateaus is satisfied, and there is at most one consecutive minority length in the line not counting short ends. When the fifth plateau is encountered, the conditions for a non-axial line are no longer satisfied because the constraint on the length of the middle plateaus is violated (the second and third plateaus are more than one pixel length shorter than the longest length plateau). Thus, the surface becomes a curve at this point because the Q changes to three as illustrated in FIG. 17. Thus, the shape selector 118 of FIG. 10 would select the curve tags stored in buffer 114 for the current surface since the entire surface does not satisfy the criteria for a non-axial line.

Although the possibility for the surface being a non-axial line would generally end at the fourth plateau in FIG. 17, there is an exception to the rule. In the preferred embodiment, the non-axial line tag generator 104 of FIG. 10 utilizes three buffers and tags are generated for three non-axial lines. The first buffer stores the tags for the primary non-axial line which either spans the surface or terminates when the Q changes to three. The second and third buffers store tags for second and third non-axial lines. The second buffer stores the tags for a non-axial line until the Q changes to 2; thereafter the third buffer stores tags for the third non-axial line (which begins with a Q of one) and continues until the surface terminates or the Q changes to three. If the second and third non-axial lines are able to span the entire surface, then the entire surface is deemed two intersecting non-axial lines.

This exception to the general rule is illustrated in FIG. 17. As explained above, the primary non-axial line terminates in FIG. 17 when the fifth plateau is reached. However, the second non-axial terminates when the fourth plateau is reached where the Q changes to 2, and the third non-axial line begins with a Q of one. Because the third non-axial line is able to reach the end of the line while the Q is still 2, the entire surface is deemed two intersecting non-axial lines. Thus, the tags stored in the second and third buffers are transferred to buffer 106 of FIG. 10 which is then selected by the shape selector 118 as the output of the data tagger 8.

Non-Axial Line Tag Placement

A particular algorithm is employed in the present invention to place the floating and line tags on a non-axial line. The placement of the tags depends on the number and length of the plateaus in a non-axial line, and recursion is used to generalize the tag placement onto any number of plateaus. The tag placement algorithm is first described for non-axial lines comprising two, three and four plateaus, which leads to the general, recursive tag placement algorithm.

A tag is placed on a defining surface of a plateau. In FIG. 12, for example, the tags are placed on the bottom surface of the white plateaus which is the western border of the white feature in the raster image. The float tags are placed on the ends of the extreme plateaus (beginning and end plateaus). The placement of the line tags depends on the number and length of the plateaus.

Figure 18A:
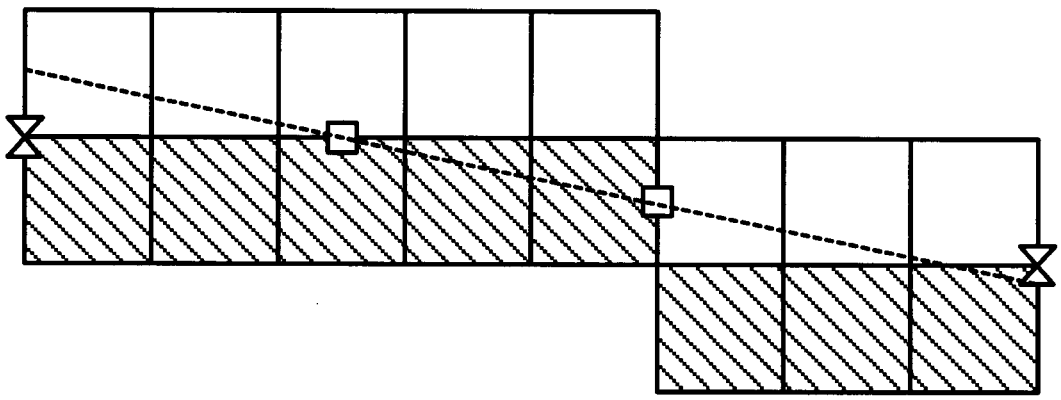
FIGS. 18A–18F show various examples of how the tags are placed on non-axial lines.
Figure 18B:
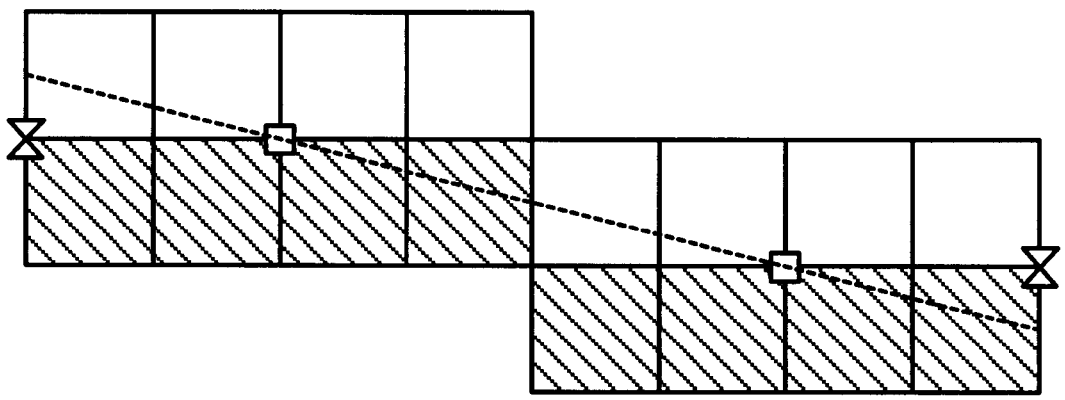

Referring to FIG. 18A, if a non-axial line comprises two plateaus wherein one plateau is more than one pixel longer than the other plateau, then one line tag is placed at the midpoint of the longer plateau, and the other line tag is placed at the midpoint of a step surface between the two plateaus. If a non-axial line comprises two plateaus that differ in length by at most one pixel, then the line tags are placed at the midpoint of each plateau as illustrated in FIG. 18B.

If a non-axial line comprises three plateaus, the line tag placements are determined by the length of the plateaus. Using the convention disclosed above for the plateau lengths (S=Short, M=Moderate, L=Long), the various permutations for the lengths of three plateaus and the corresponding line tag placements are:

SML: The first tag is placed on the midpoint of the moderate length. The second tag is placed on the midpoint of the long length.

SLS: One tag is placed on the midpoint of the long length. The other tag is placed on the step of the longer short length. If the short lengths are the same length, the line tag can be placed on either step.

SLM: The first tag is placed on the midpoint of the long length. The second tag is placed on the midpoint of the moderate length.

SLL: The tags are placed on the midpoints of the long lengths.

MML: The first tag is placed on the midpoint of the beginning moderate length. The second tag is placed on the midpoint of the long length.

MLS: The first tag is placed on the midpoint of the moderate length. The second tag is placed on the midpoint of the long length.

MLM: The first tag is placed on the midpoint of either moderate length. It doesn't matter which one. The second tag is placed on the midpoint of the long length.

MLL: The tags are placed on the midpoints of the long lengths.

LMS: The first tag is placed on the midpoint of the long length. The second tag is placed on the midpoint of the moderate length.

LMM: The first tag is placed on the midpoint of the long length. The second tag is placed on the midpoint of the ending moderate length.

LML: The first tag is placed on the midpoint of either long length. It doesn't matter which one. The second tag is placed on the midpoint of the moderate length.

LLS: The tags are placed on the midpoints of the long lengths.

LLM: The tags are placed on the midpoints of the long lengths.

LLL: The tags are placed on the midpoints of the beginning and ending long lengths.

If a non-axial line comprises four plateaus, then neither of the two middle plateaus can be a short length. The various permutations for the lengths of three plateaus and the corresponding line tag placements are:

1L, 1M, 2S: The line tags are placed at the midpoint of the long and moderate plateaus.

1L, 2M, 1S: The first line tag is placed on the midpoint of the long plateau The second line tag is placed on the midpoint of the plateau that is the most distant from the long plateau.

1L, 3M: The first line tag is placed on the midpoint of the long plateau. The second line tag is placed on the midpoint of the plateau that is the most distant from the long plateau.

2L, 2S: The line tags are placed at the midpoint of the long plateaus.

2L, 1M, 1S: If the moderate plateau is a middle plateau, the first line tag is placed on the midpoint of the moderate plateau. The second line tag is placed on the midpoint of the long plateau that is the most distant from the moderate plateau.

If the moderate plateau is an end plateau, the line tags are placed at the midpoint of the long plateaus.

2L, 2M: The line tags are placed at the midpoint of the long plateaus.

3L, 1S: The line tags are placed at the midpoint of the long plateaus that are closest to the ends of the lines.

3L, 1M: If the moderate plateau is a middle plateau, the first line tag is placed on the midpoint of the moderate plateau. The second line tag is placed on the midpoint of the long plateau that is the most distant from the moderate plateau.

If the moderate plateau is an end plateau, the line tags are placed at the midpoint of the long plateaus that are closest to the ends of the lines.

4L: The line tags are placed at the midpoint of the long plateaus that are closest to the ends of the lines.

Figure 18D:
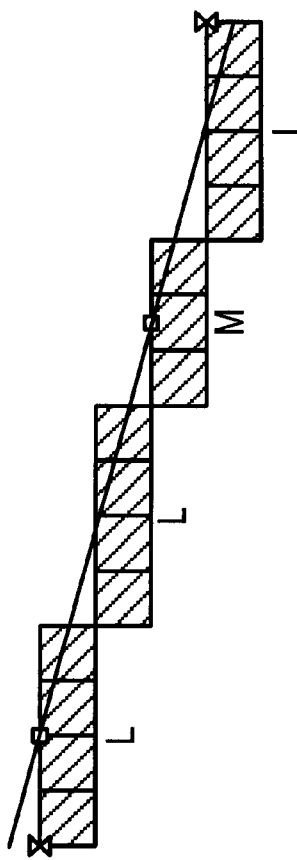
Figure 18F:
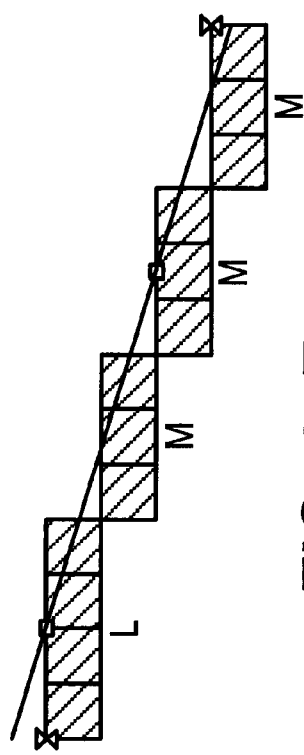
Figure 18C:
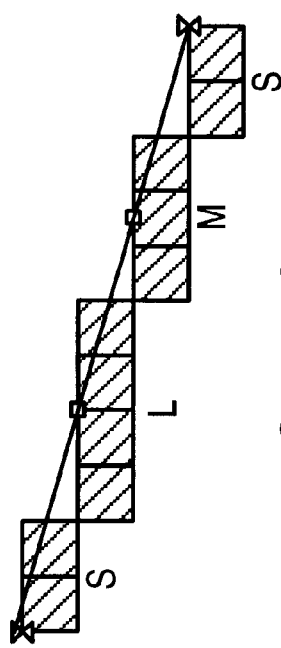
Figure 18E:
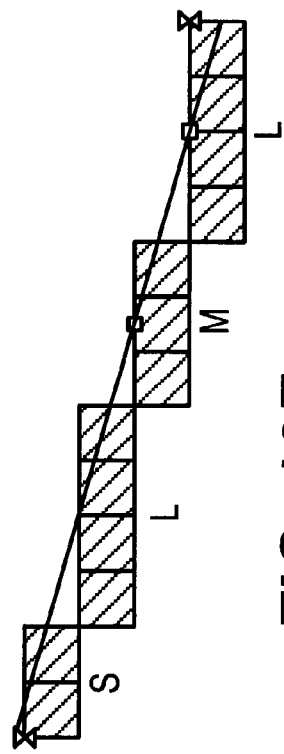

FIGS. 18C–18D illustrate non-axial lines comprising four plateaus and the line tag placements using the above rules. In FIG. 18C, the four plateau lengths are 1L, 1M, 2S and therefore the tags are placed at the midpoint of the long and moderate plateaus. In FIG. 18D, the four plateau lengths are 3L, 1M where the moderate length plateau is a middle plateau and therefore one of the line tags is placed at the midpoint of the moderate length plateau and the other line tag is placed at the midpoint of the long length plateau that is most distant from the moderate length plateau (i.e., the first plateau). In FIG. 18E, the four plateau lengths are 2L, 1M where the moderate length plateau is a middle plateau and therefore one of the line tags is placed at the midpoint of the moderate length plateau and the other line tag is placed at the midpoint of the long length plateau that is most distant from the moderate length plateau (the second or the last plateau). In FIG. 18F, the four plateau lengths are 1L, 3M and therefore one of the line tags is placed at the midpoint of the long length plateau and the other line tag is placed at the midpoint of the moderate length plateau that is most distant from the long length plateau. In FIG. 18F, the last plateau is considered a short length plateau because it is not a long length plateau. Because a line tag is never placed on a short length plateau at the ends of a non-axial line, the second line tag in FIG. 18F is placed on the second to last moderate length plateau.

From the above rules for non-axial lines comprising two, three and four plateaus, a general rule is derived for the placement of the line tags on non-axial lines. First the rule is disclosed, and then an example application of the rule is illustrated with reference to FIGS. 19A and 19B.

A level of recursion is established based on the line quality Q for a non-axial line. At the first level of recursion, the Js and Ns as well as the line quality Q are based on the lengths of the plateaus as described above, where the length of the plateaus is considered the selected marker length. Thus, at the first level when there are no Ns, the Q is one, and when there are Ns Q is two. At the next level of recursion, the number of Js between Ns at the current level determines the Ls, Ms, Ss, Js, Ns, and Q for the next in level, where the number of Js between Ns is considered the selected marker length. The line tags are placed at the highest level of recursion where Q is still two.

When the recursion level exceeds one, there are multiple plateaus in the selected marker length. The line tags are placed on the next lower level of recursion on the N lengths that are closest to the line ends. This process is followed until the recursion reaches the first level. The line tags are then placed at the midpoint of the N plateaus that are closest to the line ends.

The line tag placement varies based on the number of Js and Ns. Taking into account that there must be at least one N since the Q is two, there are the following possibilities:

2 or more Ns: The line tags are placed on the Ns closest to the line ends.

1N: The first line tag is placed on the N length. The second tag is placed on the J length that is furthest from the N length.

The above described line tag placement rules for a non-axial line are better understood from the example provided in FIGS. 19A and 19B. Referring to FIG. 19A, at the first level of recursion (level 0) the plateau lengths is the selected marker length. The J length plateau is three pixels and the N length plateau is two pixels. The Q is two at the first level because there is at least one N length plateau. At the next level of recursion (level 1), the number of Js between Ns at level 0 become the selected marker length. Thus, at level 1 there are 3Js, 3Js, 2Js, 3Js, 3Js, and then 2Js. The selected marker length thus becomes 2 because there are 2Js between Ns at level 1. At the next level of recursion (level 2), there are 2Js and then 2Js which means there are no Ns and the Q is one. Therefore, the tags are placed using the above rules at level 1 where the Q is still 2.

At level 1 there are 2 Ns (two 2 marker lengths) and according to the above rule the line tags are placed on the Ns closest to the line ends. Starting with the first 2 marker length at level 1 and traversing down toward the beginning of the line until level 0 is reached, the first line tag is placed on the adjacent N length plateau as shown in FIG. 19A. When traversing the other 2 marker length at level 1, if traversing toward the line end it terminates at the line end. However, the line tag cannot be placed on a short end so instead the line tag is placed on the N length plateau at level 0 at the left end of the 2 marker length as shown in FIG. 19A. That is, the line tag is placed by traversing down the left side of the second 2 marker length at level 1 and then placing the tag on the adjacent N length plateau at level 0.

Referring now to FIG. 19B, at level 2 the 2 marker length is a short end so the Q is 1 at level 2. Thus, the tags are placed using the above rules at level 1 where the Q is still 2. At level 1 there is 1 N (one 2 marker length) and therefore the first line tag is placed on the N length (the 2 marker length), and the second tag is placed on the J length that is furthest from the N length (the last 3 marker length). The first tag is placed by traversing down the 2 marker length toward the beginning of the line and placing the tag on the adjacent N length plateau at level 0. The second tag is placed by traversing down the left side of the last 3 marker length and placing the tag on the adjacent N length plateau at level 0.

Contemplated Embodiments

Figure 20:
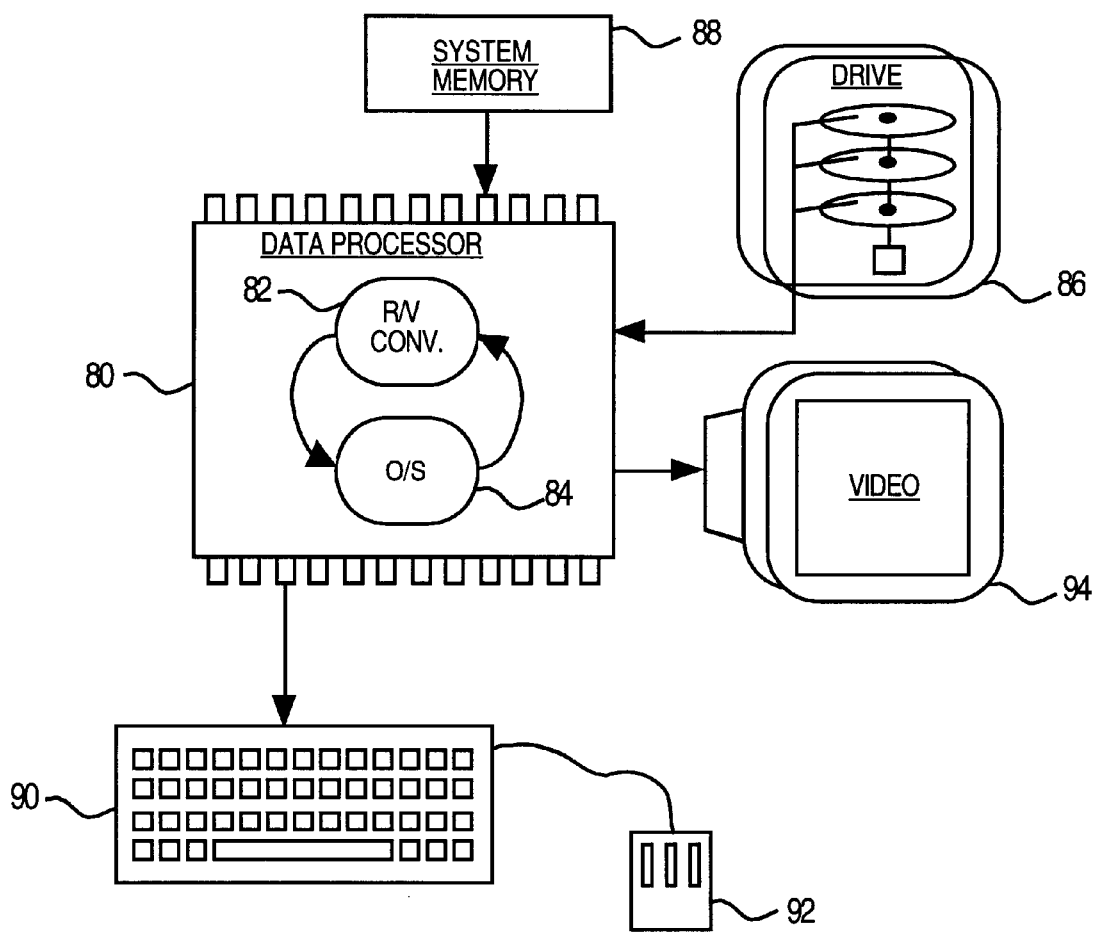
FIG. 20 shows an embodiment of the present invention comprising a system memory for storing a computer program which implements the aspects of the present, and a data processor for executing the steps of the computer program.

Referring now to FIG. 20, shown is an embodiment of the present invention wherein the raster-to-vector (R/V) converter is implemented as a computer program 82 executed by a data processor 80 running under a particular operating system (O/S) 84. A non-volatile memory, such as a disc drive 86, stores the operating system 84 and the R/V converter 82 when the computer system is powered down. When the computer system is powered up, the O/S 84 and R/V converter 82 are loaded into a system memory (RAM) 88, and the data processor 80 reads and executes the O/S 84 and R/V converter 82 from the system memory 88. The raster image to be converted into a vector image may be stored on the disc drive 86, or it may alternatively be loaded in real time from some other external device such as a scanner. An end user may interface with the computer system through a keyboard 90 and mouse 92 in order to direct which raster images are to be converted, and to display the vector images on a video display 94.

Figure 21:
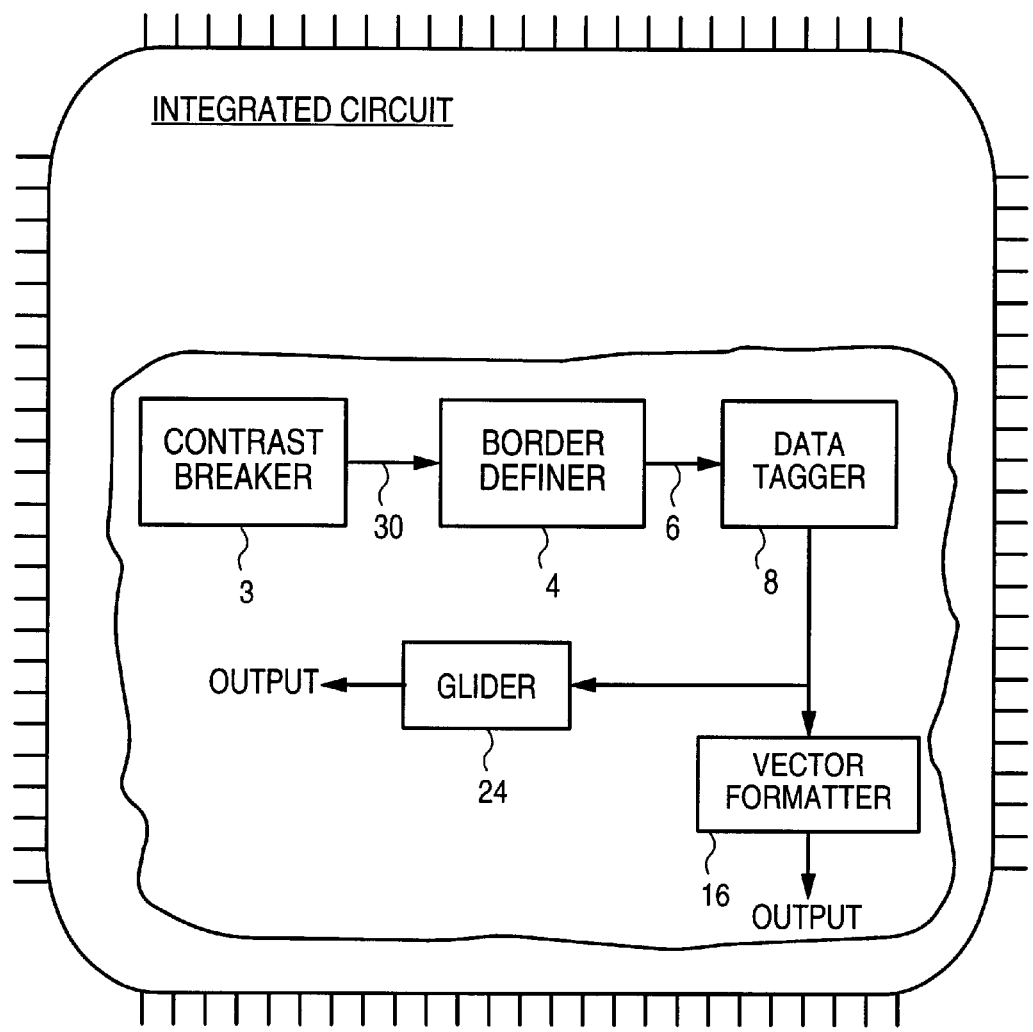
FIG. 21 illustrates an alternative embodiment of the present invention: an integrated circuit comprising logic circuits for implementing the aspects of the present invention.

An alternative embodiment of the present invention is shown in FIG. 21. In this embodiment, the raster-to-vector converter is implemented as part of an image processing integrated circuit. Some of the components shown in FIG. 2 are shown in FIG. 21 as combinatorial logic circuits and lookup tables implemented in transistor circuitry. It is within the ability of those skilled in the art to convert the source code into equivalent logic circuits for incorporation into an image processing integrated circuit.

The objects of the invention have been fully realized through the embodiments disclosed herein. Those skilled in the art will appreciate that the aspects of the invention can be achieved through various other embodiments without departing from the essential function. The particular embodiments disclosed are illustrative and not meant to limit the scope of the invention as appropriately construed by the following claims.

I claim:

1. An apparatus for converting a raster image comprising a plurality of pixels into a plurality of data tags representing at least one shape in the raster image, the apparatus comprising:

a system memory for storing steps of a computer program; and a computer processor connected to the system memory for executing the steps of the computer program, wherein the computer program comprises:

(a) a border definer for generating a border string sequence representing a border in the raster image, wherein:

the border string sequence comprises a plurality of surface strings; and a surface string comprises a receive slope and a send slope representing a slope of the border passing through a predetermined area of the raster image;

(b) a surface string sequencer for converting the border string sequence into one or more surfaces, wherein a surface comprises one or more surface string sequences representing a section of the border string sequence; and (c) a data tagger comprising:

a non-axial line tag generator, responsive to the surface string sequences, for generating data tags which define a non-axial line shape in the raster image;

an axial line tag generator, responsive to the surface string sequences, for generating data tags which define an axial line shape in the raster image;

a curve tag generator, responsive to the surface string sequences, for generating data tags which define a curve shape in the raster image; and a shape selector for selecting between the data tags generated by the non-axial line tag generator, the axial line tag generator, and the curve tag generator based on a predetermined criteria.

2. The apparatus as recited in claim 1, wherein the shape selector selects the data tags which define a non-axial line shape when the non-axial line tag generator indicates that the surface string sequences of a current surface meet a predetermined criteria for a non-axial line shape.

3. The apparatus as recited in claim 2, wherein when the current surface does not meet the criteria for a non-axial line shape, the shape selector selects the data tags which define an axial line shape when the axial line tag generator indicates that the surface string sequences of the current surface meet a predetermined criteria for an axial line shape.

4. The apparatus as recited in claim 3, wherein when the current surface does not meet the criteria for a non-axial line shape or an axial line shape, the shape selector selects the data tags which define a curve shape when the curve tag generator indicates that the surface string sequences of the current surface meet a predetermined criteria for a curve shape.

5. The apparatus as recited in claim 2, wherein when:
   (a) the current surface does not meet the criteria for a non-axial line shape; and
   (b) the current surface meets the criteria for both an axial line shape and a curve shape,
the shape selector selects the data tags for the current surface using a predetermined criteria based on the data tags generated by the axial line tag generator and the curve tag generator.

6. The apparatus as recited in claim 2, wherein when:
   (a) the current surface does not meet the criteria for a non-axial line shape; and
   (b) the current surface meets the criteria for both an axial line shape and a curve shape,
the shape selector selects the data tags for the current surface based on a shape assigned to an adjacent surface.

7. The apparatus as recited in claim 6, wherein when:
   (a) the current surface does not meet the criteria for a non-axial line shape;
   (b) the current surface meets the criteria for both an axial line shape and a curve shape; and
   (c) the current surface is the first or last surface of a current border,
the shape selector selects the data tags for the current surface based on a shape assigned to an adjacent surface of an adjacent border.

8. The apparatus as recited in claim 6, wherein when:
   (a) the current surface does not meet the criteria for a non-axial line shape;
   (b) the current surface meets the criteria for both an axial line shape and a curve shape; and
   (c) the current surface is not the first or last surface of a current border,
the shape selector selects the data tags for the current surface based on a shape assigned to an adjacent surface within the border comprising the current surface.

9. An integrated circuit for converting a raster image comprising a plurality of pixels into a plurality of data tags representing at least one shape in the raster image, the integrated circuit comprising:
   (a) a border definer for generating a border string sequence representing a border in the raster image, wherein:
      the border string sequence comprises a plurality of surface strings; and
      a surface string comprises a receive slope and a send slope representing a slope of the border passing through a predetermined area of the raster image;
   (b) a surface string sequencer for converting the border string sequence into one or more surfaces, wherein a surface comprises one or more surface string sequences representing a section of the border string sequence; and
   (c) a data tagger comprising:
      a non-axial line tag generator, responsive to the surface string sequences, for generating data tags which define a non-axial line shape in the raster image;
      an axial line tag generator, responsive to the surface string sequences, for generating data tags which define an axial line shape in the raster image;
      a curve tag generator, responsive to the surface string sequences, for generating data tags which define a curve shape in the raster image; and
      a shape selector for selecting between the data tags generated by the non-axial line tag generator, the axial line tag generator, and the curve tag generator based on a predetermined criteria.

10. The integrated circuit as recited in claim 9, wherein the shape selector selects the data tags which define a non-axial line shape when the non-axial line tag generator indicates that the surface string sequences of a current surface meet a predetermined criteria for a non-axial line shape.

11. The integrated circuit as recited in claim 10, wherein when the current surface does not meet the criteria for a non-axial line shape, the shape selector selects the data tags which define an axial line shape when the axial line tag generator indicates that the surface string sequences of the current surface meet a predetermined criteria for an axial line shape.

12. The integrated circuit as recited in claim 11, wherein when the current surface does not meet the criteria for a non-axial line shape or an axial line shape, the shape selector selects the data tags which define a curve shape when the curve tag generator indicates that the surface string sequences of the current surface meet a predetermined criteria for a curve shape.

13. The integrated circuit as recited in claim 10, wherein when:
   (a) the current surface does not meet the criteria for a non-axial line shape; and
   (b) the current surface meets the criteria for both an axial line shape and a curve shape,
the shape selector selects the data tags for the current surface using a predetermined criteria based on the data tags generated by the axial line tag generator and the curve tag generator.

14. The integrated circuit as recited in claim 10, wherein when:
   (a) the current surface does not meet the criteria for a non-axial line shape; and
   (b) the current surface meets the criteria for both an axial line shape and a curve shape,
the shape selector selects the data tags for the current surface based on a shape assigned to an adjacent surface.

15. The integrated circuit as recited in claim 14, wherein when:
   (a) the current surface does not meet the criteria for a non-axial line shape;
   (b) the current surface meets the criteria for both an axial line shape and a curve shape; and (c) the current surface is the first or last surface of a current border, the shape selector selects the data tags for the current surface based on a shape assigned to an adjacent surface of an adjacent border.

16. The integrated circuit as recited in claim 14, wherein when:

(a) the current surface does not meet the criteria for a non-axial line shape;

(b) the current surface meets the criteria for both an axial line shape and a curve shape; and (c) the current surface is not the first or last surface of a current border, the shape selector selects the data tags for the current surface based on a shape assigned to an adjacent surface within the border comprising the current surface.

17. A method of converting a raster image comprising a plurality of pixels into a plurality of data tags representing at least one shape in the raster image, the method comprising the steps of:

(a) generating a border string sequence representing a border in the raster image, wherein:
the border string sequence comprises a plurality of surface strings; and
a surface string comprises a receive slope and a send slope representing a slope of the border passing through a predetermined area of the raster image;

(b) converting the border string sequence into one or more surfaces, wherein a surface comprises one or more surface string sequences representing a section of the border string sequence; and (c) processing the surface string sequences to:
generate data tags which define a non-axial line shape in the raster image;
generate data tags which define an axial line shape in the raster image;
generate data tags which define a curve shape in the raster image; and (d) selecting between the non-axial line shape, axial line shape and curve shape data tags based on a predetermined criteria.

18. The method of converting a raster image as recited in claim 17, wherein the step of selecting between shapes comprises the step of selecting the data tags which define a non-axial line shape when the step of generating the non-axial line data tags indicates that the surface string sequences of a current surface meet a predetermined criteria for a non-axial line shape.

19. The method of converting a raster image as recited in claim 18, wherein when the current surface does not meet the criteria for a non-axial line shape, the step of selecting between shapes comprises the step of selecting the data tags which define an axial line shape when the step of generating the axial line data tags indicates that the surface string sequences of the current surface meet a predetermined criteria for an axial line shape.

20. The method of converting a raster image as recited in claim 19, wherein when the current surface does not meet the criteria for a non-axial line shape or an axial line shape, the step of selecting between shapes comprises the step of selecting the data tags which define a curve shape when the step of generating the curve data tags indicates that the surface string sequences of the current surface meet a predetermined criteria for a curve shape.

21. The method of converting a raster image as recited in claim 18, wherein when:

(a) the current surface does not meet the criteria for a non-axial line shape; and (b) the current surface meets the criteria for both an axial line shape and a curve shape, the step of selecting between shapes comprises the step of selecting the data tags for the current surface using a predetermined criteria based on the axial line data tags and the curve data tags.

22. The method of converting a raster image as recited in claim 18, wherein when:

(a) the current surface does not meet the criteria for a non-axial line shape; and (b) the current surface meets the criteria for both an axial line shape and a curve shape, the step of selecting between shapes comprises the step of selecting the data tags for the current surface based on a shape assigned to an adjacent surface.

23. The method of converting a raster image as recited in claim 22, wherein when:

(a) the current surface does not meet the criteria for a non-axial line shape;

(b) the current surface meets the criteria for both an axial line shape and a curve shape; and (c) the current surface is the first or last surface of a current border, the step of selecting between shapes comprises the step of selecting the data tags for the current surface based on a shape assigned to an adjacent surface of an adjacent border.

24. The method of converting a raster image as recited in claim 22, wherein when:

(a) the current surface does not meet the criteria for a non-axial line shape;

(b) the current surface meets the criteria for both an axial line shape and a curve shape; and (c) the current surface is not the first or last surface of a current border, the step of selecting between shapes comprises the step of selecting the data tags for the current surface based on a shape assigned to an adjacent surface within the border comprising the current surface.

25. A computer program embodied on a computer-readable medium for converting a raster image comprising a plurality of pixels into a plurality of data tags representing at least one shape in the raster image, the computer program comprising source code segments comprising:

(a) a border definer for generating a border string sequence representing a border in the raster image, wherein:
the border string sequence comprises a plurality of surface strings; and
a surface string comprises a receive slope and a send slope representing a slope of the border passing through a predetermined area of the raster image;

(b) a surface string sequencer for converting the border string sequence into one or more surfaces, wherein a surface comprises one or more surface string sequences representing a section of the border string sequence; and (c) a data tagger comprising:
a non-axial line tag generator, responsive to the surface string sequences, for generating data tags which define a non-axial line shape in the raster image;
an axial line tag generator, responsive to the surface string sequences, for generating data tags which define an axial line shape in the raster image;

a curve tag generator, responsive to the surface string sequences, for generating data tags which define a curve shape in the raster image; and a shape selector for selecting between the data tags generated by the non-axial line tag generator, the axial line tag generator, and the curve tag generator based on a predetermined criteria.

26. The computer program as recited in claim 25, wherein the shape selector selects the data tags which define a non-axial line shape when the non-axial line tag generator indicates that the surface string sequences of a current surface meet a predetermined criteria for a non-axial line shape.

27. The computer program as recited in claim 26, wherein when the current surface does not meet the criteria for a non-axial line shape, the shape selector selects the data tags which define an axial line shape when the axial line tag generator indicates that the surface string sequences of the current surface meet a predetermined criteria for an axial line shape.

28. The computer program as recited in claim 27, wherein when the current surface does not meet the criteria for a non-axial line shape or an axial line shape, the shape selector selects the data tags which define a curve shape when the curve tag generator indicates that the surface string sequences of the current surface meet a predetermined criteria for a curve shape.

29. The computer program as recited in claim 26, wherein when:

(a) the current surface does not meet the criteria for a non-axial line shape; and (b) the current surface meets the criteria for both an axial line shape and a curve shape, the shape selector selects the data tags for the current surface using a predetermined criteria based on the data tags generated by the axial line tag generator and the curve tag generator.

30. The computer program as recited in claim 26, wherein when:

(a) the current surface does not meet the criteria for a non-axial line shape; and (b) the current surface meets the criteria for both an axial line shape and a curve shape, the shape selector selects the data tags for the current surface based on a shape assigned to an adjacent surface.

31. The computer program as recited in claim 30, wherein when:

(a) the current surface does not meet the criteria for a non-axial line shape;

(b) the current surface meets the criteria for both an axial line shape and a curve shape; and (c) the current surface is the first or last surface of a current border, the shape selector selects the data tags for the current surface based on a shape assigned to an adjacent surface of an adjacent border.

32. The computer program as recited in claim 30, wherein when:

(a) the current surface does not meet the criteria for a non-axial line shape;

(b) the current surface meets the criteria for both an axial line shape and a curve shape; and (c) the current surface is not the first or last surface of a current border, the shape selector selects the data tags for the current surface based on a shape assigned to an adjacent surface within the border comprising the current surface.

* * * * *